(12) United States Patent
Kanekar et al.

(10) Patent No.: US 8,077,604 B1
(45) Date of Patent: *Dec. 13, 2011

(54) LOAD SHARING AND REDUNDANCY SCHEME

(75) Inventors: Bhushan Mangesh Kanekar, San Jose, CA (US); Saravanakumar Rajendran, San Jose, CA (US); Jonathan Davar, Los Altos Hills, CA (US)

(73) Assignee: Cisco Technology, Inc., San Jose, CA (US)

( * ) Notice: Subject to any disclaimer, the term of this patent is extended or adjusted under 35 U.S.C. 154(b) by 1315 days.

This patent is subject to a terminal disclaimer.

(21) Appl. No.: 11/190,696

(22) Filed: Jul. 26, 2005

Related U.S. Application Data

(60) Division of application No. 10/723,371, filed on Nov. 25, 2003, now Pat. No. 7,006,431, which is a continuation of application No. 09/342,859, filed on Jun. 29, 1999, now Pat. No. 6,751,191.

(51) Int. Cl.
*H04J 1/16* (2006.01)
*H04L 12/66* (2006.01)
*H04L 12/28* (2006.01)

(52) U.S. Cl. .................. 370/219; 370/356; 370/392

(58) Field of Classification Search .................. None
See application file for complete search history.

(56) References Cited

U.S. PATENT DOCUMENTS

| | | |
|---|---|---|
| 4,692,918 A | 9/1987 | Elliott et al. |
| 4,827,411 A | 5/1989 | Arrowood et al. |
| 4,965,772 A | 10/1990 | Daniel et al. |
| 5,016,244 A | 5/1991 | Massey, Jr. et al. |
| 5,018,133 A | 5/1991 | Tsukakoshi et al. |
| 5,218,600 A | 6/1993 | Schenkyr et al. |
| 5,315,592 A * | 5/1994 | Conant et al. ............... 370/401 |
| 5,371,852 A | 12/1994 | Attanasio et al. |
| 5,414,704 A | 5/1995 | Spinney |
| 5,423,002 A | 6/1995 | Hart |
| 5,452,447 A | 9/1995 | Nelson et al. |
| 5,473,599 A * | 12/1995 | Li et al. ............... 370/219 |
| 5,488,412 A | 1/1996 | Majeti et al. |
| 5,506,987 A | 4/1996 | Abramson et al. |
| 5,511,208 A | 4/1996 | Boyles et al. |
| 5,515,429 A | 5/1996 | Kawada et al. |
| 5,541,911 A | 7/1996 | Nilakantan et al. |
| 5,544,320 A | 8/1996 | Konrad |

(Continued)

FOREIGN PATENT DOCUMENTS

WO 95/29544 11/1995

(Continued)

OTHER PUBLICATIONS

T. Li, B. Cole, P. Morton, and D. Li, "Cisco Hot Standby Router Protocol (HSRP)," Mar. 1998, Network Working Group RFC 2281 (http://ftp.ietf.org/rfc/rfc2281.txt?number=2281).

(Continued)

*Primary Examiner* — Melanie Jagannathan
(74) *Attorney, Agent, or Firm* — Weaver Austin Villeneuve & Sampson LLP

(57) ABSTRACT

Methods and apparatus for providing a device for forwarding packets in a network are disclosed. A first router and a second router having a shared set of interfaces are provided, enabling the first router and the second router to share forwarding data for forwarding packets on the shared set of interfaces.

27 Claims, 12 Drawing Sheets

U.S. PATENT DOCUMENTS

| | | | |
|---|---|---|---|
| 5,555,244 A | 9/1996 | Gupta et al. | |
| 5,572,528 A | 11/1996 | Shuen | |
| 5,586,121 A | 12/1996 | Moura et al. | |
| 5,611,049 A | 3/1997 | Pitts | |
| 5,619,552 A | 4/1997 | Karppanen et al. | |
| 5,644,713 A | 7/1997 | Makishima | |
| 5,644,720 A | 7/1997 | Boll et al. | |
| 5,673,265 A | 9/1997 | Gupta et al. | |
| 5,729,537 A | 3/1998 | Billstrom | |
| RE35,774 E | 4/1998 | Moura et al. | |
| 5,740,375 A | 4/1998 | Dunne et al. | |
| 5,751,971 A | 5/1998 | Dobbins et al. | |
| 5,774,660 A | 6/1998 | Brendel et al. | |
| 5,787,470 A | 7/1998 | DiSimone et al. | |
| 5,793,763 A | 8/1998 | Mayes et al. | |
| 5,818,845 A | 10/1998 | Moura et al. | |
| 5,825,759 A | 10/1998 | Liu | |
| 5,828,655 A | 10/1998 | Moura et al. | |
| 5,835,696 A * | 11/1998 | Hess | 714/10 |
| 5,848,241 A | 12/1998 | Misinai et al. | |
| 5,852,717 A | 12/1998 | Bhide et al. | |
| 5,859,852 A | 1/1999 | Moura et al. | |
| 5,862,345 A | 1/1999 | Okanoue et al. | |
| 5,862,451 A | 1/1999 | Grau et al. | |
| 5,872,773 A | 2/1999 | Katzela et al. | |
| 5,892,903 A | 4/1999 | Klaus | |
| 5,940,596 A | 8/1999 | Rajan et al. | |
| 5,943,604 A | 8/1999 | Chen et al. | |
| 5,946,047 A | 8/1999 | Levan | |
| 5,946,048 A | 8/1999 | Levan | |
| 5,949,753 A | 9/1999 | Alexander et al. | |
| 5,950,205 A | 9/1999 | Aviani, Jr. | |
| 5,953,335 A | 9/1999 | Erimli et al. | |
| 5,956,346 A | 9/1999 | Levan | |
| 5,959,660 A | 9/1999 | Levan | |
| 5,959,968 A | 9/1999 | Chin et al. | |
| 5,959,997 A | 9/1999 | Moura et al. | |
| 5,963,540 A | 10/1999 | Bhaskaran | |
| 5,982,745 A | 11/1999 | Wolff et al. | |
| 5,989,060 A | 11/1999 | Coile et al. | |
| 5,996,016 A | 11/1999 | Thalheimer et al. | |
| 5,996,021 A | 11/1999 | Civaniar et al. | |
| 5,999,536 A | 12/1999 | Kawafuji et al. | |
| 6,006,264 A | 12/1999 | Colby et al. | |
| 6,006,266 A | 12/1999 | Murphy et al. | |
| 6,016,388 A | 1/2000 | Dillon | |
| 6,052,718 A | 4/2000 | Gifford | |
| 6,058,425 A | 5/2000 | White | |
| 6,061,650 A | 5/2000 | Malkin et al. | |
| 6,065,061 A | 5/2000 | Blahut et al. | |
| 6,073,168 A | 6/2000 | Migdoll et al. | |
| 6,078,575 A | 6/2000 | Dommety et al. | |
| 6,088,721 A | 7/2000 | Lin et al. | |
| 6,092,178 A | 7/2000 | Jindal et al. | |
| 6,097,882 A | 8/2000 | Mogul | |
| 6,108,300 A | 8/2000 | Coile et al. | |
| 6,111,675 A | 8/2000 | Mao et al. | |
| 6,128,666 A | 10/2000 | Muller et al. | |
| 6,131,121 A | 10/2000 | Mattaway et al. | |
| 6,148,000 A | 11/2000 | Feldman et al. | |
| 6,148,410 A * | 11/2000 | Baskey et al. | 714/4 |
| 6,157,965 A | 12/2000 | Mohammed et al. | |
| 6,167,438 A | 12/2000 | Yates et al. | |
| 6,167,446 A | 12/2000 | Lister et al. | |
| 6,173,312 B1 | 1/2001 | Atarashi et al. | |
| 6,178,455 B1 | 1/2001 | Schutte et al. | |
| 6,182,139 B1 | 1/2001 | Brendel | |
| 6,189,043 B1 | 2/2001 | Buyukkoc et al. | |
| 6,189,102 B1 | 2/2001 | Beser | |
| 6,195,689 B1 | 2/2001 | Bahlmann | |
| 6,195,705 B1 | 2/2001 | Leung | |
| 6,202,169 B1 | 3/2001 | Razzaghe-Ashrafi | |
| 6,205,481 B1 | 3/2001 | Heddaya et al. | |
| 6,227,785 B1 | 5/2001 | Kanekar et al. | |
| 6,230,196 B1 | 5/2001 | Guenthner et al. | |
| 6,230,326 B1 | 5/2001 | Unger et al. | |
| 6,236,678 B1 | 5/2001 | Horton et al. | |
| 6,240,089 B1 | 5/2001 | Okanoue et al. | |
| 6,240,461 B1 | 5/2001 | Cieslak et al. | |
| 6,243,360 B1 | 6/2001 | Basilico | |
| 6,243,760 B1 | 6/2001 | Armbruster et al. | |
| 6,247,054 B1 | 6/2001 | Malkin | |
| 6,249,820 B1 | 6/2001 | Dobbins et al. | |
| 6,253,234 B1 | 6/2001 | Hunt et al. | |
| 6,260,070 B1 | 7/2001 | Shah et al. | |
| 6,286,084 B1 | 9/2001 | Wexler et al. | |
| 6,292,832 B1 | 9/2001 | Shah et al. | |
| 6,295,276 B1 | 9/2001 | Datta et al. | |
| 6,298,063 B1 | 10/2001 | Coile et al. | |
| 6,298,381 B1 | 10/2001 | Shah et al. | |
| 6,301,223 B1 | 10/2001 | Hrastar et al. | |
| 6,324,564 B1 | 11/2001 | Thieke et al. | |
| 6,327,622 B1 | 12/2001 | Jindal et al. | |
| 6,330,602 B1 | 12/2001 | Law et al. | |
| 6,330,606 B1 | 12/2001 | Logue et al. | |
| 6,339,830 B1 | 1/2002 | See et al. | |
| 6,345,294 B1 | 2/2002 | O'Toole et al. | |
| 6,370,147 B1 | 4/2002 | Beser | |
| 6,377,972 B1 | 4/2002 | Guo et al. | |
| 6,385,204 B1 | 5/2002 | Hoefelmeyer et al. | |
| 6,389,027 B1 | 5/2002 | Lee et al. | |
| 6,389,462 B1 | 5/2002 | Cohen et al. | |
| 6,397,260 B1 | 5/2002 | Wils et al. | |
| 6,415,323 B1 | 7/2002 | McCanne et al. | |
| 6,434,608 B1 | 8/2002 | Desai | |
| 6,438,123 B1 | 8/2002 | Chapman | |
| 6,438,652 B1 | 8/2002 | Jordan et al. | |
| 6,442,558 B1 | 8/2002 | Brown et al. | |
| 6,446,121 B1 | 9/2002 | Shah et al. | |
| 6,449,249 B1 | 9/2002 | Cloonan et al. | |
| 6,449,250 B1 | 9/2002 | Otani et al. | |
| 6,463,475 B1 | 10/2002 | Calhoun | |
| 6,466,964 B1 | 10/2002 | Leung et al. | |
| 6,470,027 B1 | 10/2002 | Birrell, Jr. | |
| 6,470,389 B1 | 10/2002 | Chung et al. | |
| 6,473,802 B2 | 10/2002 | Masters | |
| 6,477,197 B1 | 11/2002 | Unger | |
| 6,477,522 B1 | 11/2002 | Young | |
| 6,480,469 B1 | 11/2002 | Moore et al. | |
| 6,487,591 B1 | 11/2002 | Budhraja et al. | |
| 6,493,318 B1 | 12/2002 | Bare | |
| 6,499,088 B1 | 12/2002 | Wexler et al. | |
| 6,505,254 B1 | 1/2003 | Johnson et al. | |
| 6,510,162 B1 | 1/2003 | Fijolek et al. | |
| 6,510,469 B1 | 1/2003 | Starnes et al. | |
| 6,512,774 B1 | 1/2003 | Vepa et al. | |
| 6,519,646 B1 | 2/2003 | Gupta et al. | |
| 6,532,493 B1 | 3/2003 | Aviani et al. | |
| 6,553,568 B1 | 4/2003 | Fijolek et al. | |
| 6,556,591 B2 | 4/2003 | Bernath et al. | |
| 6,577,642 B1 | 6/2003 | Fijolek et al. | |
| 6,578,066 B1 | 6/2003 | Logan et al. | |
| 6,578,077 B1 | 6/2003 | Rakoshitz et al. | |
| 6,588,016 B1 | 7/2003 | Chen et al. | |
| 6,594,305 B1 | 7/2003 | Roeck et al. | |
| 6,598,232 B1 | 7/2003 | McAlear | |
| 6,606,315 B1 | 8/2003 | Albert et al. | |
| 6,606,352 B2 | 8/2003 | Horton et al. | |
| 6,611,868 B1 | 8/2003 | Arutyunov | |
| 6,621,810 B1 | 9/2003 | Leung | |
| 6,633,585 B1 | 10/2003 | Ghanwani et al. | |
| 6,636,498 B1 | 10/2003 | Leung | |
| 6,636,971 B1 | 10/2003 | Loukianov | |
| 6,650,624 B1 | 11/2003 | Quigley et al. | |
| 6,650,641 B1 | 11/2003 | Albert | |
| 6,665,304 B2 | 12/2003 | Beck et al. | |
| 6,671,259 B1 | 12/2003 | He et al. | |
| 6,674,713 B1 | 1/2004 | Berg et al. | |
| 6,683,873 B1 | 1/2004 | Kwok et al. | |
| 6,687,217 B1 | 2/2004 | Chow et al. | |
| 6,691,165 B1 | 2/2004 | Bruck et al. | |
| 6,724,724 B1 | 4/2004 | Swenson et al. | |
| 6,728,748 B1 | 4/2004 | Mangipudi et al. | |
| 6,735,631 B1 | 5/2004 | Oehrke et al. | |
| 6,742,044 B1 | 5/2004 | Aviani et al. | |
| 6,751,191 B1 * | 6/2004 | Kanekar et al. | 370/217 |
| 6,760,302 B1 | 7/2004 | Ellinas et al. | |

| | | | |
|---|---|---|---|
| 6,760,316 | B1 | 7/2004 | Hebsgaard et al. |
| 6,765,892 | B1 | 7/2004 | Leung et al. |
| 6,768,743 | B1 | 7/2004 | Borella et al. |
| 6,779,039 | B1 | 8/2004 | Bommareddy et al. |
| 6,789,125 | B1 | 9/2004 | Aviani et al. |
| 6,795,857 | B1 | 9/2004 | Leung et al. |
| 6,795,860 | B1 | 9/2004 | Shah et al. |
| 6,801,949 | B1 | 10/2004 | Bruck et al. |
| 6,804,221 | B1 | 10/2004 | Magret et al. |
| 6,826,599 | B1 | 11/2004 | Shaffer et al. |
| 6,832,252 | B1 | 12/2004 | Cieslak et al. |
| 6,835,696 | B2 | 12/2004 | Saito et al. |
| 6,839,809 | B1 | 1/2005 | Forster et al. |
| 6,857,026 | B1 | 2/2005 | Cain |
| 6,920,498 | B1 | 7/2005 | Gourlay et al. |
| 6,952,401 | B1 | 10/2005 | Kadambi et al. |
| 6,981,056 | B1 | 12/2005 | Aviani et al. |
| 7,006,431 | B1 * | 2/2006 | Kanekar et al. ............... 370/217 |
| 7,039,720 | B2 | 5/2006 | Alfieri et al. |
| 7,062,570 | B2 | 6/2006 | Hong et al. |
| 7,065,043 | B2 | 6/2006 | Wu et al. |
| 7,065,779 | B1 | 6/2006 | Crocker et al. |
| 7,072,979 | B1 | 7/2006 | Aviani et al. |
| 7,111,061 | B2 | 9/2006 | Leighton et al. |
| 7,117,273 | B1 | 10/2006 | Toole et al. |
| 7,136,383 | B1 | 11/2006 | Wilson |
| 7,143,195 | B2 | 11/2006 | Vange et al. |
| 7,149,217 | B2 | 12/2006 | Alexander et al. |
| 7,151,758 | B2 | 12/2006 | Kumaki et al. |
| 7,162,540 | B2 | 1/2007 | Jasen et al. |
| 7,260,102 | B2 | 8/2007 | Mehrvar et al. |
| 7,349,979 | B1 | 3/2008 | Cieslak et al. |
| 7,395,348 | B1 | 7/2008 | Cieslak et al. |
| 7,401,159 | B1 | 7/2008 | Aviani et al. |
| 7,593,346 | B2 | 9/2009 | McLaggan et al. |
| 7,702,732 | B1 | 4/2010 | Squire et al. |
| 7,881,208 | B1 | 2/2011 | Nosella et al. |
| 2001/0014097 | A1 | 8/2001 | Beck et al. |
| 2001/0042105 | A1 | 11/2001 | Koehler et al. |
| 2001/0049741 | A1 | 12/2001 | Skene et al. |
| 2002/0010783 | A1 | 1/2002 | Primak et al. |
| 2002/0012327 | A1 | 1/2002 | Okada |
| 2002/0019879 | A1 | 2/2002 | Jasen et al. |
| 2002/0023159 | A1 | 2/2002 | Vange et al. |
| 2002/0040400 | A1 | 4/2002 | Masters |
| 2002/0062372 | A1 | 5/2002 | Hong et al. |
| 2002/0099849 | A1 | 7/2002 | Alfieri et al. |
| 2002/0120697 | A1 | 8/2002 | Generous et al. |
| 2002/0129134 | A1 | 9/2002 | Leighton et al. |
| 2002/0191562 | A1 | 12/2002 | Kumaki et al. |
| 2003/0014540 | A1 | 1/2003 | Sultan et al. |
| 2003/0031178 | A1 | 2/2003 | Haeri et al. |
| 2003/0037165 | A1 | 2/2003 | Shinomiya et al. |
| 2003/0133420 | A1 | 7/2003 | Haddad |
| 2003/0161303 | A1 | 8/2003 | Mehvar et al. |
| 2004/0071141 | A1 | 4/2004 | Dhara et al. |
| 2005/0111352 | A1 | 5/2005 | Ho et al. |
| 2005/0213832 | A1 | 9/2005 | Schofield et al. |
| 2006/0251097 | A1 | 11/2006 | Chapman et al. |
| 2006/0262722 | A1 | 11/2006 | Chapman et al. |

FOREIGN PATENT DOCUMENTS

| | | |
|---|---|---|
| WO | WO98/31107 | 7/1998 |
| WO | 2005/018176 | 2/2005 |

OTHER PUBLICATIONS

Release notes for 3Com corporation, "Conducting a Redundant Route for Network Resiliency", Mar. 1994, *NET Builder Family Bridge/Router*, pp. 26-29.

J. Moy, RFC 1247 "OSPF Version 2" Jul. 19, 1991.

D. Oran, RFC 1142 "OSI IS-SI Intra-domain Routing Protocol" Feb. 1990.

Uyless Black, "TCP/IP and Related Protocols", 1992 *McGraw-Hill, Inc.*, pp. 226-249.

T. Li, et al., RFC 2281 "Cisco Hot Standby Router Protocol (HSRP)" Mar. 1998.

Chambless, et al., "Home Agent Redundancy Protocol (HARP)" Oct. 27, 1997.

Networking Working Group, RFC 2002 "IP Mobility Support" Oct. 1996.

K. Egevang et al., "The IP Network Address Translator (NAT)", Network Working Group, pp. 1-10, May 1994.

Y. Rekhter, et al, "*Address Allocation for Private Internets,*" RFC 1918, Network Working Group, Feb. 1996, 9 Pages.

P. Srisuresh, et al, "*Load Sharing Using IP Network Address Translation (LSNAT),*" RFC: 2391, Network Working Group, Aug. 1998, 18 Pages.

P. Srisuresh, et al, "*IP Network Address Translator (NAT) Terminology and Considerations* ," RFC 2663, Network Working Group, Aug. 1999, 30 Pages.

E. Gerich, "*Guidelines for Management of IP Address Space,*" RFC: 1466, Network Working Group, May 1993, 10 Pages.

C.E. Perkins and T. Jagannadh, "DHCP for Mobile Networking with TCP/IP," IBM, Watson Research Center IEEE, Apr. 1995.

3Com Corporation, "Configuring Boundary Routing System Architecture," NETBuilder Family Bridge/Router Release Notes, Mar. 1994, pp. 26-29.

Daruwalla, et al. "Method for a Cable Modem to Rapidly Switch to a Backup CMTS," U.S. Appl. No. 09/484,611, filed Jan. 18, 2000, 53 Pages.

Zang, et al. "Cable Network Redundancy Architecture," U.S. Appl. No. 09/484,612, filed Jan. 18, 2000, 60 Pages.

Nosella, et al. "Gateway Load Balancing Protocol," U.S. Appl. No. 09/883,674, filed Jun. 18, 2001, 48 Pages.

Jayasenan, et al. "Stateful Network Address Translation Protocol Implemented Over a Data Network," U.S. Appl. No. 09/735,199, filed Dec. 11, 2000, 67 Pages.

Leung, et al. "Methods and Apparatus for Implementing Home Agent Redundancy," U.S. Appl. No. 10/008,494, filed Nov. 9, 2001, 53 Pages.

Daruwalla, et al. "Routing Protocol Based Redundancy Design for Shared-Access Networks," U.S. Appl. No. 09/484,189, filed Jan. 18, 2000, 53 Pages.

Kent Leung, "Mobile IP Mobility Agent Standby Protocol," U.S. Appl. No. 09/714,466, filed Nov. 14, 2000, 32 Pages.

Ian Wilson, "Redirection to a Virtual Router," U.S. Appl. No. 09/748,828, filed Dec. 26, 2000, 32 Pages.

Eager, et al., "Adaptive Load Sharing in Homogeneous Distributed Systems," IEEE, Transactions on Software Engineering, vol. Se-12, No. 5, May 1986, pp. 662-675.

Akami Technologies, Inc.—Global Internet Content Delivery— "How FreeFlow Works," webmaster@akamai.com 1999-2000.

Digital Island, Inc.—e-Business Without Limits-, "Enabling Technologies," http://www.digisle.net. No date.

Internap, "Preferred Collocation Services," http://www.internap.com Copyright 2001 Internap Network Services Corporation.

Meyer, et al., Request for Comments No. 2026, entitled, "Generic Routing Encapsulation (GRE)," Jan. 2000, Internet Engineering Task Force, 9 pages.

Mockapetris, P., Request for Comments No. 1034, entitled, "Domain Names—Concepts and Facilities," Nov. 1987, Internet Engineering Task Force, 31 pages.

Information Sciences Institute, Request for Comments No. 793, entitled, "Transmission Control Protocol—DARPA Internet Program—Protocol Specification," Sep. 1981, Internet Engineering Task Force, 49 pages.

David M. Gifford, "Replica Routing," U.S. Appl. No. 09/472,964, filed Dec. 28, 1999, 37 Pages.

Johnson et al., "Dynamic Server Organization," U.S. Appl. No. 09/294,837, filed Apr. 19, 1999, 42 pages.

Lu et al., "Automatic Network Addresses Assignment and Translation Interference," U.S. Appl. No. 60/160,535, filed Oct. 20, 1999, 127 pages.

Lu et al., "Method and Apparatus for Automatic Network Address Assignment," U.S. Appl. No. 60/178,063, filed Jan. 24, 2000, 74 pages.

Johnson et al., "Method and Apparatus for Determining a Network Topology in the Presence of Network Address Translation," U.S. Appl. No. 60/178,062, filed Jan. 24, 2000, 32 pages.

Toole et at, "Fast-Changing Network Status and Load Monitoring and Feedback," U.S. Appl. No. 60/177,985, filed Jan. 25, 2000, 20 pages.
Kirk Johnson, "A Method and Apparatus for Minimalist Approach to Implementing Server Selection," U.S. Appl. No. 60/177,415, filed Jan. 21, 2000, 39 pages.
Office Action dated Mar. 17, 1995 for U.S. Appl. No. 08/231,330.
Notice of Allowance dated Jul. 24, 1995 for U.S. Appl. No. 08/231,330.
Allowed Claims for U.S. Appl. No. 08/231,330.
International Search Report mailed on Aug. 24, 1995 for PCT Application No. PCT/US1995/04887.
Office Action dated Feb. 2, 2000 for U.S. Appl. No. 09/107,701.
Notice of Allowance dated Aug. 14, 2000 for U.S. Appl. No. 09/107,701.
Allowed Claims for U.S. Appl. No. 09/107,701.
Y. Rekhter, et al. "Address Allocation for Private Internets," RFC: 1918, Network Working Group, Feb. 1996, 9 pages.
Office Action for U.S. Appl. No. 09/714,466 dated Jun. 4, 2001.
Office Action for U.S. Appl. No. 09/714,466 dated Nov. 27, 2001.
Notice of Allowance for U.S. Appl. No. 09/714,466 dated May 21, 2002.
Allowed Claims for U.S. Appl. No. 09/714,466.
Office Action dated Nov. 15, 2002 for U.S. Appl. No. 09/342,859.
Final Office Action dated May 7, 2003 for U.S. Appl. No. 09/342,859.
Notice of Allowance dated Aug. 4, 2003 for U.S. Appl. No. 09/342,859.
Supplemental Notice of Allowance dated Oct. 3, 2003 for U.S. Appl. No. 09/342,859.
Allowed Claims for U.S. Appl. No. 09/342,859.
Office Action dated Dec. 15, 2004 for U.S. Appl. No. 10/723,371.
Notice of Allowance dated May 3, 2005 for U.S. Appl. No. 10/723,371.
Supplemental Notice of Allowance dated Sep. 15, 2005 for U.S. Appl. No. 10/723,371.
Allowed Claims for U.S. Appl. No. 10/723,371.
S. Knight et al. "Virtual Redundancy Protocol", Apr. 1998, IETF, RFC 2338.
Office action dated Nov. 18, 2002 for U.S. Appl. No. 09/484,189.
Final Office action dated Apr. 21, 2003 for U.S. Appl. No. 09/484,189.
Office action dated Dec. 8, 2003 for U.S. Appl. No. 09/484,189.
Notice of Allowance dated Apr. 15, 2004 for U.S. Appl. No. 09/484,189.
Allowed claims for U.S. Appl. No. 09/484,189.
Office Action dated Feb. 12, 2008 for U.S. Appl. No. 10/899,668.
Final Office Action dated Aug. 20, 2008 for U.S. Appl. No. 10/899,668.
Office Action dated Feb. 12, 2003 for U.S. Appl. No. 09/484,911.
Office Action dated Mar. 18, 2003 for U.S. Appl. No. 09/484,911.
Final Office Action dated Aug. 15, 2003 for U.S. Appl. No. 09/484,911.
Office Action dated Jan. 21, 2004 for U.S. Appl. No. 09/484,911.
Final Office Action dated Aug. 10, 2004 for U.S. Appl. No. 09/484,911.
Office Action dated Feb. 16, 2005 for U.S. Appl. No. 09/484,911.
Office Action dated Jul. 19, 2005 for U.S. Appl. No. 09/484,911.
Notice of Allowance dated Jan. 5, 2006 for U.S. Appl. No. 09/484,911.
Allowed claims for U.S. Appl. No. 09/484,911.
Office Action dated Jan. 31, 2008 for U.S. Appl. No. 11/636,725.
Final Office Action dated Sep. 26, 2008 for U.S. Appl. No. 11/636,725.
Office Action dated Nov. 6, 2002 for U.S. Appl. No. 09/484,612.
Office Action dated Apr. 25, 2003 for U.S. Appl. No. 09/484,612.
Office Action dated Nov. 6, 2003 for U.S. Appl. No. 09/484,612.
Office Action dated Mar. 10, 2004 for U.S. Appl. No. 09/484,612.
Office Action dated Sep. 16, 2004 for U.S. Appl. No. 09/484,612.
Notice of Allowance dated Jun. 3, 2005 for U.S. Appl. No. 09/484,612.
Notice of Allowance dated Nov. 22, 2005 for U.S. Appl. No. 09/484,612.
Allowed claims for U.S. Appl. No. 09/484,612.

Office Action dated Apr. 10, 2003 for U.S. Appl. No. 09/476,188.
Notice of Allowance dated Sep. 8, 2003 for U.S. Appl. No. 09/476,188.
Allowed claims for U.S. Appl. No. 09/476,188.
Valloppillil, Vinod, "Cache Array Routing Protocol v1.0", Oct. 20, 1997, Internet-Draft, http://ds1.internic/net/internet-drafts/draft-vinod-carp-v1-02.txt, pp. 1-6*.
Cisco Technology, Inc., "Configuring IP Routing Protocols," Dec. 10, 1997, http://www.cisco.com/univercd/data/doc/software/11_2/cnp1/5ciprout.htm#REF40277, pp. 1-6, 120-122.
Ousterhout, John K., "A Trace-Driven Analysis of the UNIX 4.2 BSD File System," Jan. 2, 1993, *Computer Science Division, Electrical Engineering and Computer Science*, University of California, Berkeley, CA, pp. 1-12.
Welch, Brent, "A Comparison of the Vnode and Sprite File System Architectures," *Proceedings of the File System Workshop*, May 1992, pp. 29-44.
Ousterhout, John K., "Beating the I/O Bottleneck: A Case for Log-Structured File Systems," Jan. 30, 1992, *Computer Science Division, Electrical Engineering anc Computer Sciences*, University of California, Berkeley, CA, pp. 1-17.
Martin Arlitt, Ludmila Cherkasova, John Dilley, Rich Friedrich and Tai Jin, of Hewlett-Packard Laboratories, "*Evaluating Content Management Techniques for Web Proxy Caches*," Apr. 30, 1999, 9 pages.
Cardellini et al., "Dynamic Load Balancing on Web-Server Systems," *Internet Computing, IEEE*, May-Jun. 1993, vol. 3, Issue 3, pp. 28-39.
Asit Dan et al., "Multimedia Caching Strategies for Heterogeneous Application and Server Environments," *Multimedia Tools and Application*, May 1997, vol. 4, No. 3, pp. 379-312.
Gibson et al., "File Server Scaling with Network-Attached Secure Disks," *Association for Computing Machinery*, 1997, pp. 272-284.
Pai et al., "Locality-Aware Request Distribution in Cluster-based Network Servers," *Association for Computing Machinery*, 1998, pp. 205-216.
Perkins et al., "Route Optimization for Mobile IP," *Cluster Computing*, Jun. 1998 vol. 1, No. 2, pp. 161-176.
Office Action dated Oct. 14, 2003 for U.S. Appl. No. 09/606,418.
Notice of Allowance dated Feb. 10, 2004 for U.S. Appl. No. 09/606,418.
Notice of Allowance dated Jul. 1, 2005 for U.S. Appl. No. 09/606,418.
Allowed claims for U.S. Appl. No. 09/606,418.
Office Action dated Dec. 2, 2003 for U.S. Appl. No. 09/608,802.
Office Action dated Mar. 15, 2004 for U.S. Appl. No. 09/608,802.
Final Office Action dated Dec. 1, 2004 for U.S. Appl. No. 09/608,802.
Office Action dated Sep. 20, 2005 for U.S. Appl. No. 09/608,802.
Final Office Action dated Mar. 2, 2006 for U.S. Appl. No. 09/608,802.
Office Action dated Sep. 6, 2006 for U.S. Appl. No. 09/608,802.
Final Office Action dated Jan. 30, 2007 for U.S. Appl. No. 09/608,802.
Notice of Allowance dated Oct. 25, 2007 for U.S. Appl. No. 09/608,802.
Allowed Claims for U.S. Appl. No. 09/608,802.
Gourlay et al., "Path Selection System," Filed: Dec. 19, 2001, U.S. Appl. No. 10/034,368.
Office Action dated Apr. 15, 2003 for U.S. Appl. No. 09/569,090.
Final Office Action dated Oct. 1, 2003 for U.S. Appl. No. 09/569,090.
Notice of Allowance dated Jan. 9, 2004 for U.S. Appl. No. 09/569,090.
Supplemental Notice of Allowance dated Mar. 12, 2004 for U.S. Appl. No. 09/569,090.
Allowed claims for U.S. Appl. No. 09/569,090.
Office Action for dated Sep. 24, 2007 U.S. Appl. No. 10/851,456.
Notice of Allowance dated Mar. 7, 2008 for U.S. Appl. No. 10/851,456.
Allowed claims for U.S. Appl. No. 10/851,456.
Office Action dated Oct. 6, 2003 for U.S. Appl. No. 09/569,083.
Interview Summary dated Jan. 30, 2004 for U.S. Appl. No. 09/569,083.

Notice of Allowance dated Apr. 29, 2004 for U.S. Appl. No. 09/569,083.
Allowed claims for U.S. Appl. No. 09/569,083.
Office Action dated Aug. 13, 2003 for U.S. Appl. No. 09/605,917.
Final Office Action dated Feb. 2, 2004 for U.S. Appl. No. 09/605,917.
Office Action dated Jul. 13, 2004 for U.S. Appl. No. 09/605,917.
Final Office Action dated Apr. 27, 2005 for U.S. Appl. No. 09/605,917.
Notice of Allowance dated Aug. 18, 2005 for U.S. Appl. No. 09/605,917.
Allowed claims for U.S. Appl. No. 09/605,917.
Office Action dated May 3, 2005 for U.S. Appl. No. 09/883,674.
Final Office Action dated Sep. 20, 2005 for U.S. Appl. No. 09/883,674.
Final Office Action dated Dec. 21, 2005, 2005 for U.S. Appl. No. 09/883,674.
Office Action dated Feb. 13, 2006 for U.S. Appl. No. 09/883,674.
International Search Report and Written Opinion mailed on Jul. 10, 2004 for PCT Application No. PCT/US2004/019617.
Office Action dated Apr. 20, 2004 for U.S. Appl. No. 09/748,828.
Notice of Allowance dated Dec. 21, 2004 for U.S. Appl. No. 09/748,828.
Allowed claims for U.S. Appl. No. 09/748,828.
Office Action dated Nov. 29, 2005 for U.S. Appl. No. 11/083,727.
Final Office Action dated Apr. 4, 2006 for U.S. Appl. No. 11/083,727.
Notice of Allowance dated Jun. 30, 3006 for U.S. Appl. No. 11/083,727.
Allowed claims for U.S. Appl. No. 11/083,727.
Office Action dated May 2, 2006 for U.S. Appl. No. 10/008,494.
Final Office Action dated Oct. 4, 2006 for U.S. Appl. No. 10/008,494.
Notice of Allowance dated Jan. 26, 2007 for U.S. Appl. No. 10/008,494.
Notice of Allowance dated Mar. 27, 2007 for U.S. Appl. No. 10/008,494.
Allowed Claims for U.S. Appl. No. 09/596,083.
Office Action dated Jan. 7, 2008 from EP Patent Application No. 04755658.4.
Examination Report dated Oct. 13, 2006 from EP Patent Application No. 04755658.4.
D. Farinacci, et al. Request for Comments No. 2784, entitled, "Generic Routing Encapsulation (GRE)," Mar. 200, Network Working Group.
Office Action dated Dec. 15, 2008 for Chinese Patent Application No. 200480021154.3.
Office Action dated Mar. 30, 2007 for U.S. Appl. No. 10/632,704.
Office Action dated Oct. 17, 2007 for U.S. Appl. No. 10/632,704.
Final Office Action dated May 9, 2008 for U.S. Appl. No. 10/632,704.
Notice of Allowance dated Apr. 30, 2009 for U.S. Appl. No. 10/632,704.
CN Fourth Office Action dated Mar. 23, 2010 for Chinese Patent Application No. 200480021154.3.
US Office Action dated Mar. 25, 2010 for U.S. Appl. No. 10/899,668.
US Notice of Allowance dated Jan. 26, 2010 for U.S. Appl. No. 12/020,467.
US Office Action dated Jun. 8, 2010, for U.S. Appl. No. 09/883,674.
US Final Office Action dated Sep. 10, 2010 for U.S. Appl. No. 10/899,668.
US Notice of Allowance dated Sep. 23, 2010, for U.S. Appl. No. 09/833,674.
US Notice of Allowance dated Feb. 16, 2011 for U.S. Appl. No. 10/899,668.
Office Action dated Jun. 9, 2009 for U.S. Appl. No. 10/899,668.
Office Action dated Jul. 9, 2009 for U.S. Appl. No. 12/020,467.
Office Action dated Jun. 10, 2009 for U.S. Appl. No. 09/883,674.
Office Action dated Dec. 10, 2009 for U.S. Appl. No. 09/883,674.
EP Office Action dated Sep. 3, 2009 for EP 04755658.4.
Second Office Action dated May 22, 2009 for Chinese Patent Application No. 200480021154.3.
Third Office Action dated Oct. 9, 2009 for Chinese Patent Application No. 200480021154.3.
PCT International Preliminary Report of Patentability PCT Application No. PCT/US04/019617.
Allowed Claims for U.S. Appl. No. 10/632,704.

* cited by examiner

Shared Configuration File 402

| 404 | 406 | 410 | 412 | 414 | 416 | 418 |
|---|---|---|---|---|---|---|
| Config. Int. e1 | IP Add 1.1.1.2 | mask | Router | Alt. 1.1.1.3 | mask |
| • | • | • | • | • |
| • | • | • | • | • |
| • | • | • | • | • |

Forwarding Engine Tables

LOAD SHARING AND REDUNDANCY SCHEME

RELATED APPLICATIONS

This application is a divisional of patent application Ser. No. 10/723,371, entitled "Load Sharing and Redundancy Scheme," naming Kanekar et al. as inventors, filed on Nov. 25, 2003 now U.S. Pat. No. 7,006,431, which is a continuation of patent application Ser. No. 09/342,859, now U.S. Pat. No. 6,751,191, entitled "Load Sharing and Redundancy Scheme," naming Kanekar et al. as inventors, filed on Jun. 29, 1999, both of which are incorporated herein by reference for all purposes.

BACKGROUND OF THE INVENTION

1. Field of the Invention

The present invention relates to networking technology. More particularly, the present invention relates to providing load sharing and redundancy in a network through a master router and a slave router having a shared set of interfaces in a single device.

2. Description of the Related Art

Networks are commonly used by organizations for a variety of purposes. For instance, through the use of networks, resources such as programs and data may be shared by users of the network. In addition, a computer network can serve as a powerful communication medium among widely separated users.

Communication among hosts and users of a network is often facilitated through connection to one or more routers. As shown in FIG. 1, a host 112 normally resides on a network segment 114 that enables its network entities to communicate with other entities or networks. Note that the host 112 need not directly connect to the entities or networks with which it communicates. For example, as shown in FIG. 1, the host 112 may be connected through a router R1 116. The router R1 116 may, in turn, connect one or more other routers such as router R2 118 with selected entities or networks.

Now, suppose that the host 112 wishes to send a message to a corresponding node 120. A message from the host 112 is then packetized and forwarded through the appropriate routers and to the corresponding node 120, as indicated by dotted line "packet from host" 122, according to a standard protocol. If the corresponding node 120 wishes to send a message to the host 112—whether in reply to a message from the host 112 or for any other reason—it addresses that message to the IP address of the host 112 on the network segment 114. The packets of that message are then forwarded to router R1 116 and ultimately to the host 112 as indicated by dotted line "packet to host" 124.

As described above, packets sent to and from the host 112 are forwarded via the router R1 116. As shown, the router R1 116 is the only route to and from the host 112. Thus, if the router R1 116 fails, communication with the host 112 becomes impossible. Accordingly, the reliability of the network as well as the routers in the network is of utmost importance.

As networks become a critical resource in many organizations, it is important that the networks are reliable. One way of achieving reliability is through redundancy. As described above, a single router failure may prevent communication to and from each host and user connected to the router. In many networks, it is common to provide redundancy through the use of multiple routers such that a backup router functions in the event of failure of a primary router. However, when the primary router fails, there is typically a "switchover time" that is required for the backup router to take over the functions of the primary router. As a result, such attempts to provide redundancy in switches suffer from a large switchover time. Accordingly, it would be beneficial if such redundancy could be provided with a reduction in the switchover time from a non-functional to a functional router.

In addition to reliability, it is often desirable to improve performance within a given network. In order to achieve this improvement, load sharing is often preferable. For instance, various users of a network may have a higher traffic level than other users of the network. It would therefore be desirable if performance could be achieved through the distribution of traffic among multiple routers.

In view of the above, it would be desirable if a redundancy and load sharing scheme could be implemented to reduce the switchover time upon failure of a router while implementing a load sharing scheme among multiple routers operating in a single device.

SUMMARY OF THE INVENTION

An invention is described herein that provides load sharing and redundancy in a network. This is accomplished, according to one embodiment, through the use of a master router and a slave router operating in the same chassis and having a shared set of interfaces. Prior to failure of the master router, the master router communicates shared state information to the slave router. In addition, the slave router operates in "standby mode" to obtain information from the shared set of interfaces. In this manner, the switchover time required to switch from the master router to the slave router upon failure of the master router is significantly reduced.

According to one aspect of the invention, a default gateway is associated with both the master router and the slave router. This is accomplished by assigning a shared IP address and a shared MAC address to both a first router and a second router so that the shared IP and MAC addresses are shared between the first router and the second router. Additionally, a first MAC address is assigned to the first router and a second MAC address is assigned to the second router. The default gateway is configured on the hosts such that a default gateway IP address is associated with the shared IP address. The shared IP and MAC addresses are associated with one of the routers (e.g., the first router or master router). When the master fails, the slave takes over both the shared IP address and the shared MAC address.

In order to route traffic, there are three layers of protocol: a physical layer, a data link layer, and a network layer. The data link layer is often referred to as "layer 2" while the network layer is often referred to as "layer 3." The responsibility of the data link layer is to transmit chunks of information across a link. The responsibility of the network layer is to enable systems in the network to communicate with each other. Thus, the network layer finds a path or "shortcut" through a series of connected nodes that must forward packets in the specified direction.

According to another aspect, the master and the slave each includes a switching processor to switch packets in hardware and a routing processor to enable packets to be routed in software. The switching processor is adapted for running a layer 2 protocol (e.g., spanning tree) and the routing processor is adapted for running a layer 3 routing protocol. In addition, the master and the slave each maintains its own forwarding data. More particularly, the master and the slave each maintain a layer 2 database associated with the layer 2 protocol and a routing table associated with the layer 3 routing protocol. Both the master and the slave independently run its own layer 3 routing protocol and maintain its own routing table. However, only the master runs the layer 2 protocol. More particularly, the master saves the layer 2 protocol information in a layer 2 protocol database (e.g., spanning tree database) and sends layer 2 protocol updates to the slave so that it may similarly store the layer 2 protocol updates in its own layer 2 protocol database. When the master fails, the slave then runs the layer 2 protocol and accesses its own layer 2 protocol database. Since the slave maintains its own layer 2 protocol database and layer 3 routing table, switchover time upon failure of the master is minimized.

According to another aspect, prior to failure of the master, the slave receives updates from the master in order to synchronize operation of the two routers. For instance, the master maintains the hardware information for both the master and the slave. Therefore, in addition to sending layer 2 protocol updates, the master also sends other information related to the hardware shared by the two routers. As one example, multicast group membership for the shared ports is sent by the master to the slave. As another example, hardware information such as temperature and information related to the power supply is sent by the master to the slave.

According to yet another aspect, the master and the slave each include a forwarding engine in addition to the routing processor and the switching processor. The forwarding engines are adapted for forwarding packets in hardware and therefore increase the speed with which packets are forwarded. Each forwarding engine has an associated set of forwarding engine tables. More particularly, each forwarding engine includes a layer 2 table associating each destination MAC address with a port and router. Thus, if a packet cannot be forwarded in hardware or it is undesirable to forward the packet in hardware, the packet is forwarded by the router specified in the layer 2 table. In addition, a layer 3 shortcut table stores shortcuts (i.e., layer 3 forwarding information) for a path from a particular source IP address to a particular destination IP address. When a router forwards a packet, a shortcut is created and entered in the layer 3 shortcut table. Packets may then be forwarded by the forwarding engine for this particular path.

According to another aspect, the slave operates to update its forwarding tables during standby mode as well as upon failure of the master. In order for the slave to forward a packet, the layer 2 table of the slave's forwarding engine must contain an entry associating the desired destination MAC address with the slave router. Moreover, for the forwarding engine (i.e., hardware) of the slave to forward a packet, there must be an entry for the particular path from the source IP address to the destination IP address. Thus, prior to failure of the master, the slave's forwarding engine observes packets at the shared interfaces to obtain information from the packet header to establish shortcuts. For instance, the slave may obtain a shortcut established by the master from the packet header. The slave then updates its layer 2 and layer 3 tables with an appropriate entry as necessary.

Upon failure of the master router, the slave modifies its forwarding engine tables to enable packets to be forwarded by the slave. At a minimum, in order to forward packets in software, the slave's layer 2 table is modified to associate destination MAC addresses with the slave rather than the master. In addition, in order for a packet to be forwarded via the forwarding engine (i.e., hardware) of the slave, an entry for the specific path is identified in the slave's layer 3 table. Thus, if an entry exists in the slave's layer 3 table for the flow (e.g., path from source to destination) as provided in the packet header, the packet may be forwarded by the forwarding engine. Even if the entry in the slave's layer 3 table for that particular flow is not modified by the slave, packets may be forwarded using information in the current entry using the shortcut established by the master (e.g., with the source MAC address identifying the master). However, it is desirable to forward packets with the correct source MAC address (e.g., the MAC address of the slave). According to one embodiment, since the master and the slave routers may potentially arrive at different routing decisions and therefore different shortcuts, the shortcuts established by the master are invalidated. In order to invalidate these shortcuts, they are removed from the slave's layer 3 shortcut table. However, if all shortcuts are removed simultaneously, a large number of packets will need to be forwarded in software. Therefore, entries in the slave's layer 3 shortcut table are selected and removed gradually. For example, the entries may be removed according to port number or other criteria. Once a packet is forwarded by the slave router in software, a correct entry is created and entered in the slave's shortcut table. Packets may then be forwarded by the slave with a current shortcut as well as correct source MAC address. Thus, since the slave maintains its own forwarding engine tables, packets may be forwarded with a minimum delay time.

According to another aspect, the configuration of the master and the slave is synchronized. There are three categories of information that may be configured for each router. First, there is information that must be the same for both routers. Second, there is information that must be different for both routers. Third, there is information that can be different but is recommended to be the same for both routers. Thus, the same configuration file may be maintained on both the master and the slave to enable the routers to be synchronized with these three categories of information.

DETAILED DESCRIPTION OF THE INVENTION

In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

Figure 1:
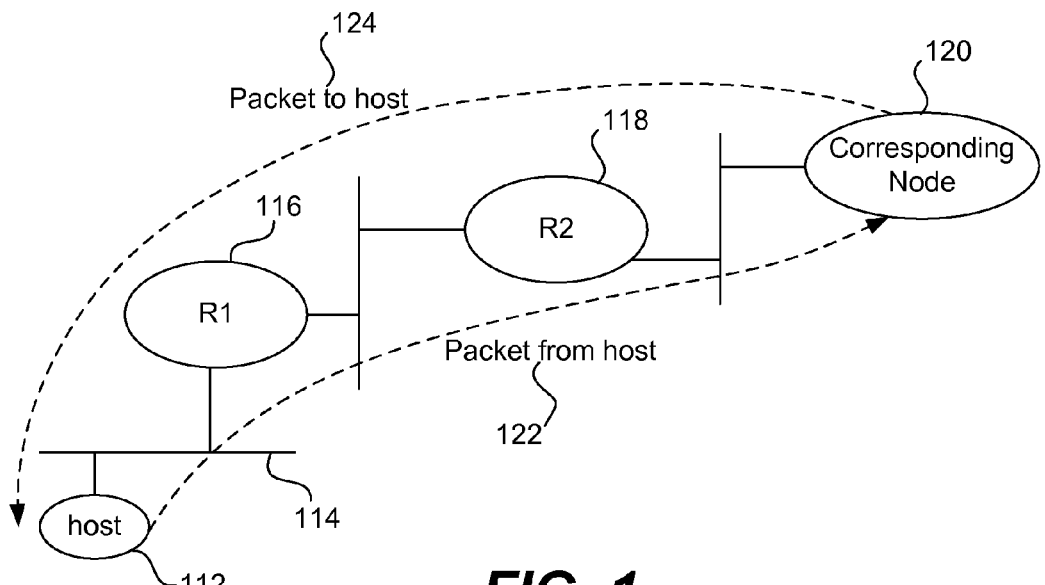
FIG. 1 is a diagram illustrating communication between a host and a corresponding node via a router.
Figure 2:
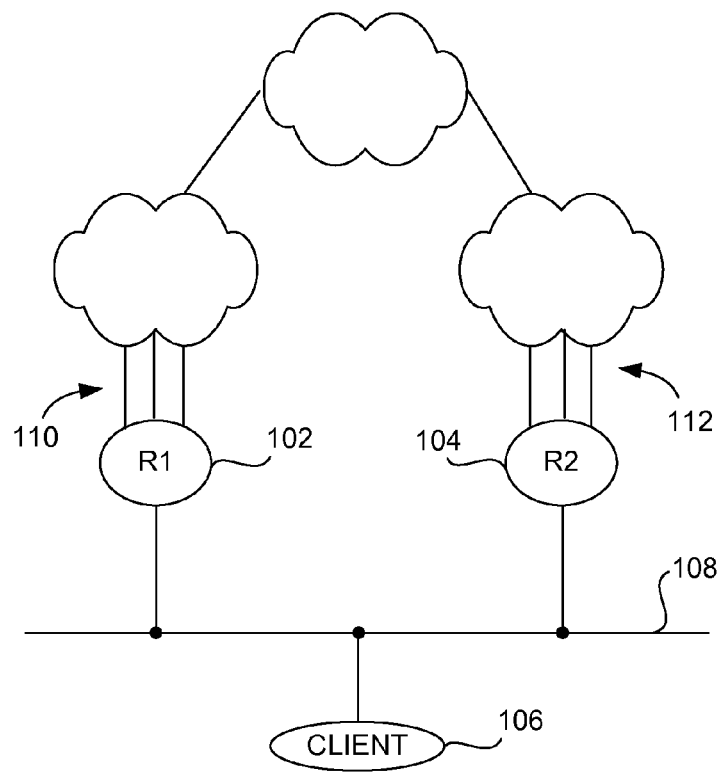
FIG. 2 is a diagram illustrating a system in which multiple routers are used to provide redundancy.

There are several ways to provide redundancy using multiple routers. For instance, two separate fully operational routers are often used to provide redundancy. FIG. 2 is a diagram illustrating such a system. As shown, a first router R1 102 and a second router R2 104 are supplied to provide redundancy in a system supporting client 106. The first router R1 102 and the second router R2 104 share a common interface 108. In addition, the first router R1 102 has an associated set of interfaces 110 and the second router R2 104 has a separate set of interfaces 112. Thus, redundancy is commonly implemented to ensure that the client 106 is supported in the event that one of the routers 102 and 104 fails. It is important to note that where multiple routers are used, they typically do not share the same interfaces. As a result, the configurations of the routers cannot be identical. Moreover, since the two routers are separate, the time to detect a failure of one of the routers is substantial.

In order to reduce the time required to detect a failure of one of the routers, the two routers may be provided in the same chassis. However, the interfaces are typically not easily shared between two routers. As a result, the configuration information cannot be shared between the routers. Moreover, since the interfaces are not shared, both routers cannot be fully operational. Since both routers are not fully operational, when one of the routers fails, there is often a substantial "switchover time" during which the alternate router is brought up. More particularly, during this time, the appropriate software is downloaded to the secondary router to enable the secondary router to take over the interfaces associated with the primary router.

Figures 3, 4:
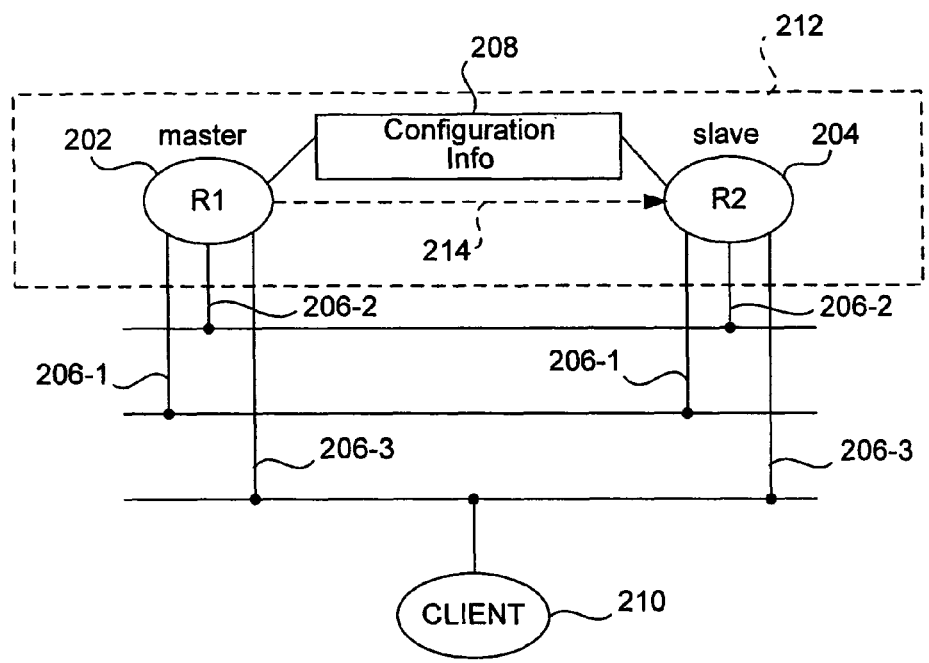
FIG. 3 is a general block diagram illustrating routers that share a single set of interfaces according to an embodiment of the invention.
FIG. 4 is a diagram illustrating an exemplary configuration file according to an embodiment of the invention.

As described above, although multiple routers are commonly used to provide redundancy in a network, the routers do not typically share a set of interfaces. As a result, the configurations of the routers are not identical and therefore the switchover time in the event of failure of the primary router (i.e., master) may be substantial. To solve this problem, the present invention provides at least two routers that share the same set of interfaces. More particularly, since both routers share the same set of interfaces, both the routers may be fully operational. FIG. 3 is a general block diagram illustrating two routers provided in the same chassis that share a single set of interfaces according to an embodiment of the invention. As shown, a first router 202 and a second router 204 share a set of interfaces 206-1, 206-2, and 206-3. Since the routers 202 and 204 share the same set of interfaces, the routers may share at least some configuration information 208 and therefore the switchover time as experienced by client 210 may be reduced. Since the routers 202 and 204 are in the same chassis 212, it is easier to ensure a similar configuration on both routers. For instance, both routers may be configured via a single console. In addition to sharing configuration information, the routers may each provide updates to the other router. For instance, where R1 202 is the master and R2 204 is the slave, information such as spanning tree protocol updates may be sent from the master to the slave as shown at 214.

According to one embodiment, two independent routers function in the same chassis to seamlessly forward packets through the use of the Hot Standby Redundancy Protocol (HSRP). According to the Hot Standby Redundancy Protocol (HSRP), a protocol available from Cisco Systems, Inc. located in San Jose, Calif., the master router and the slave router share a common MAC address and IP address. In addition, each of the routers has its own unique MAC address that will be used by the router for advertising routes to other routers. One of the routers acts as the master and it responds to Address Resolution Protocol (ARP) queries for the shared IP address with the shared MAC address. The default gateway may be configured by associating a default gateway IP address to the shared IP address. The IP to MAC binding may be either statically configured or obtained through the ARP protocol. When the master fails, the slave takes over both the shared IP address and the shared MAC address that was owned by the master. Thus, a client need only know the default gateway IP to route packets.

In order to configure the routers, there are three categories of information that may be configured for each router. First, there is information that must be the same for both routers. Second, there is information that must be different for both routers. Third, there is information that can be different but is recommended to be the same for both routers. One desirable configuration for a set of routers having the same interfaces is described as follows. More particularly, the configurations that need to be the same include the number of ports in each line card (i.e., router), the type of ports (e.g., type of VLAN to which each port belongs), and security information (e.g., access lists). Configurations that need to be different include the IP addresses associated with each interface of the routers. In other words, multiple routers cannot have the same IP address for a particular interface. In addition, the priorities associated with each router are different in order to enable load sharing among the different routers. Configurations that can be different but are recommended to be the same include routing protocols and routing tables associated with the routers. One method of implementing load sharing is described below with reference to FIGS. 8A and 8B.

According to a specific embodiment, in order to provide the configuration information for the routers sharing the same set of interfaces, a shared configuration file is created. FIG. 4 illustrates an exemplary shared configuration file. As shown, the configuration file 402 includes configuration information in multiple command lines. The command lines may be stored as text strings, as shown. Alternatively, the command lines may be stored in a binary format. The configuration may be stored in non-volatile RAM such that when read, the routers may have all necessary information to operate. More particularly, as shown, each command line 404 identifies a particular configuration with a specified router (e.g., router R1 or R2). In addition, where the configurations for the routers are different, when one router is configured, the configuration for the second router is forced. As shown, this may be accomplished by configuring both routers on the same command line. By way of example, where the IP address 406 (e.g., 1.1.1.2) and associated mask 410 are configured for a specified "master" router 412, an alternate "slave" router 414 may simultaneously be configured with an IP address 416 (e.g., 1.1.1.3) and a mask 418. More particularly, the two IP addresses 406 and 416 must be in the same subnet.

Figure 5:
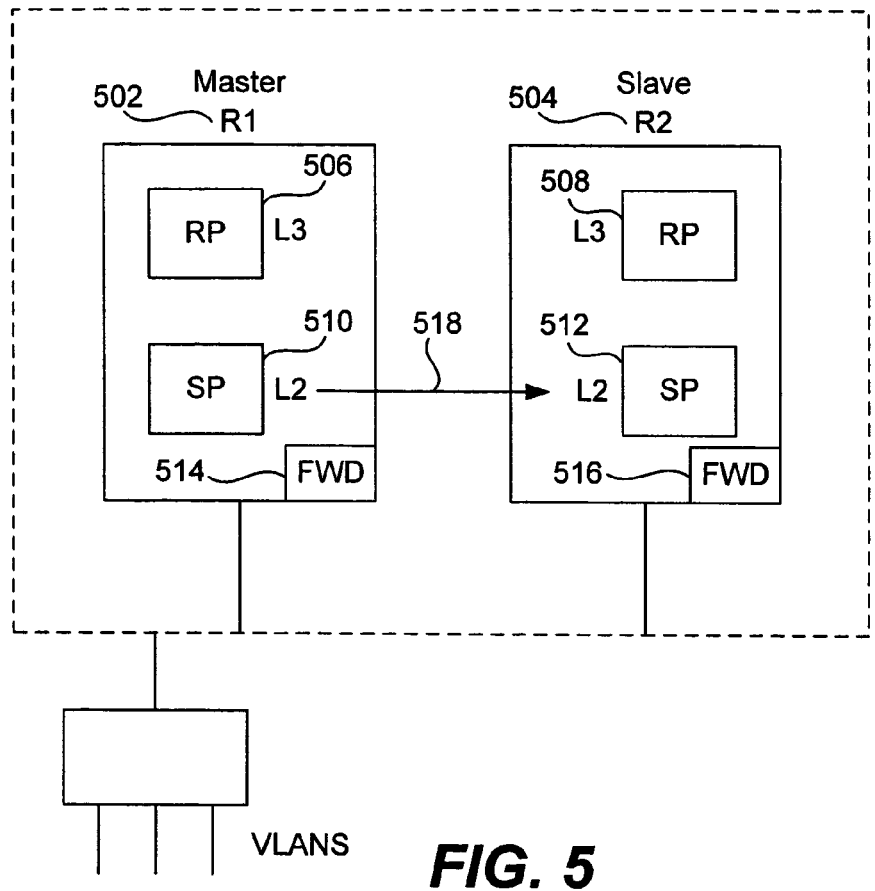
FIG. 5 is a diagram illustrating a routing and switching system according to one embodiment of the invention.

A more detailed diagram illustrating a routing and switching system according to one embodiment of the invention is presented in FIG. 5. As shown, in this embodiment, two independent operational routers R1 502 and R2 504 are provided in a single chassis, permitting the routers to communicate in the backplane of the device. When redundancy is implemented using HSRP, routers communicate their existence through "hello" packets. Thus, a failure of one of the routers is detected by another router when a specified number of consecutive "hello" packets are not received during a period of time. Since the routers communicate in the backplane of the device, a failure of one of the routers may be detected in hardware. As a result, the time in which a failure of one of the routers may be detected is minimized. Each of the routers 502 and 504 is shown in detail as including a corresponding routing processor 506 and 508, switch processor 510 and 512, and forwarding engine 514 and 516, respectively. More particularly, the routing processors 506 and 508 run the layer 3 routing protocols. In addition, since the device also functions as a bridge, the switch processors 510 and 512 are adapted for handling the layer 2 protocols (e.g., spanning tree protocol) and may therefore control the hardware by initializing the associated forwarding engines 514 and 516. However, since only one spanning tree will be used, only one of the switch processors runs the layer 2 spanning tree protocol. Therefore, the master runs the layer 2 spanning tree protocol until the master fails, at which time the slave starts running the layer 2 spanning tree protocol. The forwarding engines 514 and 516 may perform forwarding in hardware and therefore each functions as a switch.

The slave maintains its own backup information, including layer 2 and layer 3 tables. More particularly, the slave operates in standby mode and therefore obtains information by observing packets as they are received at the interfaces shared with the master. In addition, the master sends selected information to the slave during normal operation of the master, as shown at 518. For instance, when the layer 2 spanning tree protocol is updated by the master, these spanning tree protocol updates are communicated to the slave. Both the master and slave each maintain its own spanning tree database. Although only the master runs the spanning tree protocol, the slave receives the spanning tree updates from the master and stores the spanning tree updates in its own spanning tree database. As a result, the master and the slave have identical spanning tree databases, thereby providing layer 2 redundancy. Although layer 2 information is shared, information in layer 3 (i.e., routing tables) is not dynamically shared between the routers (e.g., by the routing processors), and therefore each router maintains a separate routing table. In addition, each of the forwarding engines 514 and 516 maintains its own tables, which will be described below with reference to FIGS. 13A through 13C. Thus, the slave maintains its own forwarding engine tables, spanning tree database, and routing table. Since the slave maintains its own tables and receives information such as spanning tree updates from the master, switchover time is minimized upon failure of the master.

One of the routers may fail under a variety of circumstances. First, the routing processor of one of the routers may fail. Second, one of the switch processors may fail. Third, one of the forwarding engines may fail. According to one embodiment, any of these and other failures are treated as a failure of the entire router.

Figure 6:
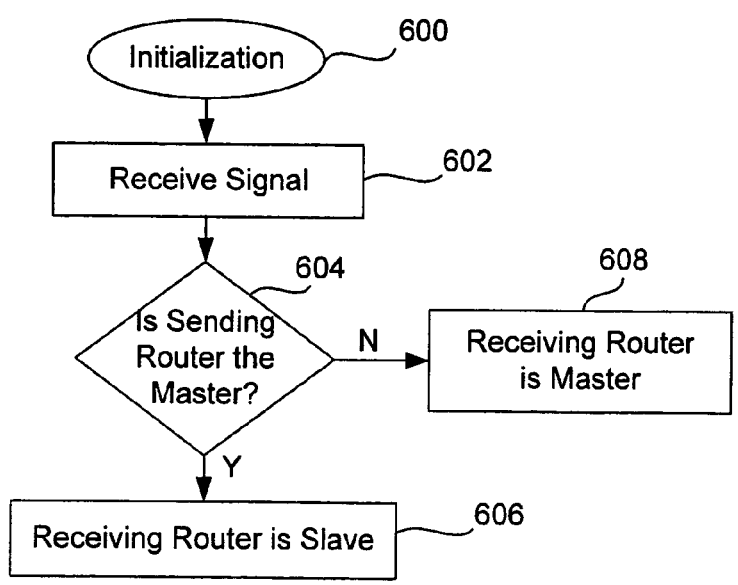
FIG. 6 is a process flow diagram illustrating one method of determining which router is the master.

While both routers are fully operational, only one functions as the "master" while the other functions as the "slave." The master therefore actively forwards packets while the slave functions in standby mode. When the master fails, the slave takes over to forward any remaining packets. During initialization of the routing system, one of the routers is determined to be the "master". A process flow diagram illustrating one method of determining which router is the master is presented in FIG. 6. Initialization of the routers as either master or slave begins at block 600. At block 602, one of the routers receives a signal from the other router indicating which router is the master router. According to one embodiment, the master sends a signal to the slave to assert that it is the master. For instance, the first router to come up may assert such a signal. This is desirable since the first router to come up will have a greater capacity for handling incoming and outgoing packets. If both routers come up simultaneously, a priority previously assigned to the routers may be used to determine which router will function as the master. For instance, the priority associated with each router may be set up by a Network Administrator. If at block 604 it is determined that the signal asserts that the sending router is the master router, the receiving router (i.e., the router receiving the signal) is determined to be the slave at block 606. Otherwise, the receiving router is determined to be the master at block 608.

One or more default gateways may be configured using Hot Standby Redundancy Protocol (HSRP)/Multigroup HSRP (M-HSRP) such that the master will be responsible for routing packets from a subset of interfaces and the slave will be responsible for routing packets from the remaining interfaces. HSRP/M-HSRP is a protocol available from Cisco Systems, Inc. located in San Jose, Calif. that provides a redundancy mechanism when more than one router is connected to the same segment of a network (e.g., Ethernet, FDDI, Token Ring). The participating routers share a common predefined MAC address and IP address. In addition, each of the routers has its own unique MAC address which will be used by the router for advertising routes to other routers. In addition, this unique MAC address will be used as the source MAC address portion of the routed packets. One of the participating routers acts as the Master and it responds to Address Resolution Protocol (ARP) queries for the shared IP address with the shared MAC address. The default gateway may be configured by associating a default gateway IP address to the shared IP address and the IP to MAC binding may be either statically configured or obtained through the ARP protocol. When the master fails, the slave takes over both the shared IP address and the shared MAC address that was owned by the master. In this manner, the slave takes over the master's interfaces upon failure of the master. Thus, a host (i.e., client) need only know the default gateway IP to route packets. As a result, the client need not be aware of which router is the master router. Nor must the client be notified when one of the routers fails.

Figure 7:
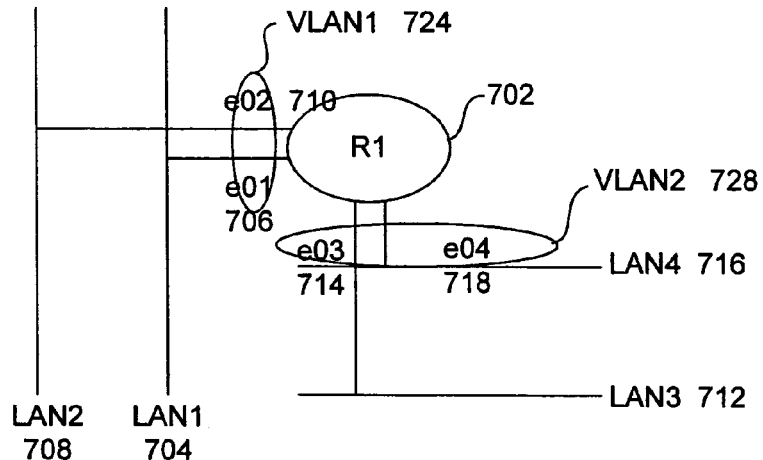
FIG. 7 is a block diagram illustrating a VLAN in which multiple LANs are grouped together.

While one default gateway may be used, it may also be desirable to use a different default gateway for different groups of users. For instance, it may be desirable to configure a first set of users to use a first default gateway and a second set of users to use a second default gateway. One way to logically group users together is through the use of virtual LANs (VLANs). FIG. 7 is a block diagram illustrating a VLAN in which multiple LANs are grouped together. As shown, router R1 702 has a plurality of interfaces that may connect to multiple LANs. As shown in FIG. 7, a first LAN 704 is coupled to a first interface 706, a second LAN 708 is coupled to a second interface 710, a third LAN 712 is coupled to a third interface 714, and a fourth LAN 716 is coupled to a fourth interface 718. As shown in FIG. 7, the first LAN 704 and the second LAN 708 are coupled into first VLAN 724 while the third LAN 712 and the fourth LAN 716 are coupled into second VLAN 728. Bridging is used to communicate among LANs of the same VLAN while routing is used to communicate across VLANs. In this manner, LANs may be grouped together according to various criteria such as functionality or project.

Figure 8:
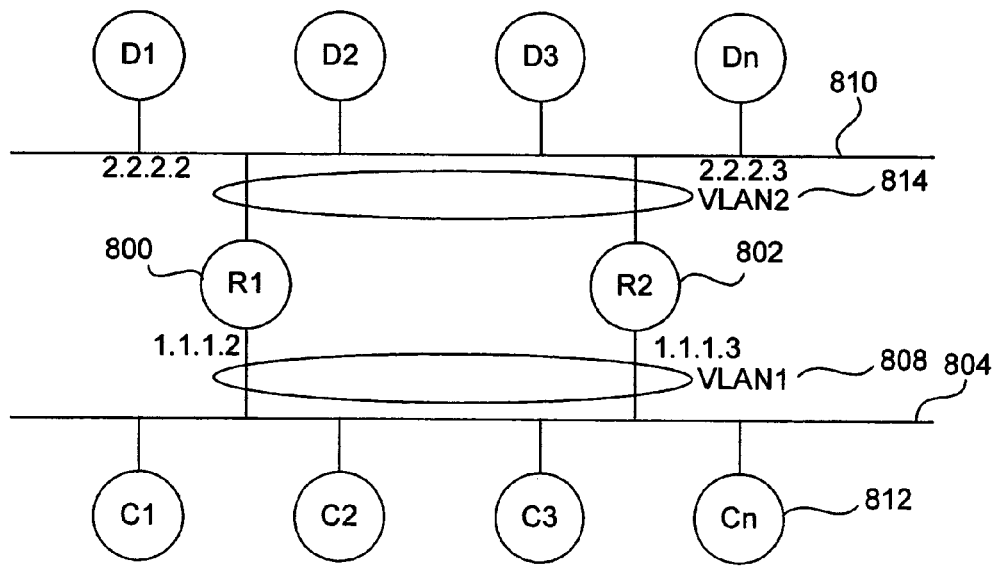
FIG. 8 illustrates an exemplary system for load sharing using VLANs according to an embodiment of the invention.

As described above, packets are routed across VLANs. FIG. 8 illustrates an exemplary system for load sharing using VLANs according to an embodiment of the invention. Routers R1 800 and R2 802 are both shown to have two interfaces, a first interface 804 and a second interface 810. The first interface 804 is connected to network segments 1.1.1.2 and 1.1.1.3 to a first VLAN 808. Similarly, the second interface 810 is connected to network segments 2.2.2.2 and 2.2.2.3 to a second VLAN 814. Multiple VLANs and clients 812 may be active on the same interface. As a result, it may be desirable to distribute the load among the multiple routers (i.e., R1 800 and R2 802) as well as accommodate the different traffic levels of each user. Thus, the requirements of each VLAN may be met through load distribution among the routers R1 800 and R2 802. Moreover, the load may be distributed among the routers R1 800 and R2 802 based upon the source of incoming packets to the routing system. More particularly, this may be accomplished through associating the users and/or VLANs with different default gateways. In this manner, the unique requirements of the different VLAN groups as well as the users within each group may be separately accommodated. Accordingly, load sharing can be achieved by configuring multiple groups between the master and slave routers and thus directing traffic to both the routers.

As described above, the load (e.g., incoming load) may be distributed among the master and the slave. For instance, suppose clients on VLAN 1 and VLAN 2 have their default gateway configured to be the master and clients on VLAN 3 and VLAN 4 have their default gateway configured to be the slave. More particularly, the hosts in VLAN 1 and VLAN 2 are configured with a default gateway of the default gateway IP address for that group and the corresponding MAC address. Similarly, the hosts on VLAN 3 and VLAN 4 are configured with the slave's information. When one of the two routers fails, the other router takes over the hosts serviced by the other router. For instance, when the master fails, the slave services the hosts on VLANs 1 and 2 in addition to the hosts on VLANs 3 and 4. Moreover, since the slave is already a member of VLANs 1 and 2 as a separate router, it already has the appropriate routing information and therefore does not have to recalculate any routing tables.

As described above with reference to FIG. 6, it is initially determined which one of the routers is master. The routers may be prioritized to provide redundancy as described above with reference to FIG. 6. In addition, load sharing may be implemented using default gateways as described above with reference to FIGS. 7 and 8. In order for the routing and switching system to function in the event of failure of one of the routers, the system is configured such that switchover time is minimized. This is accomplished, in part, through the maintaining and updating of information for both the master and slave during normal operation of the master. As a result, when the master fails, the time required to bring up the slave is minimized.

Figure 9:
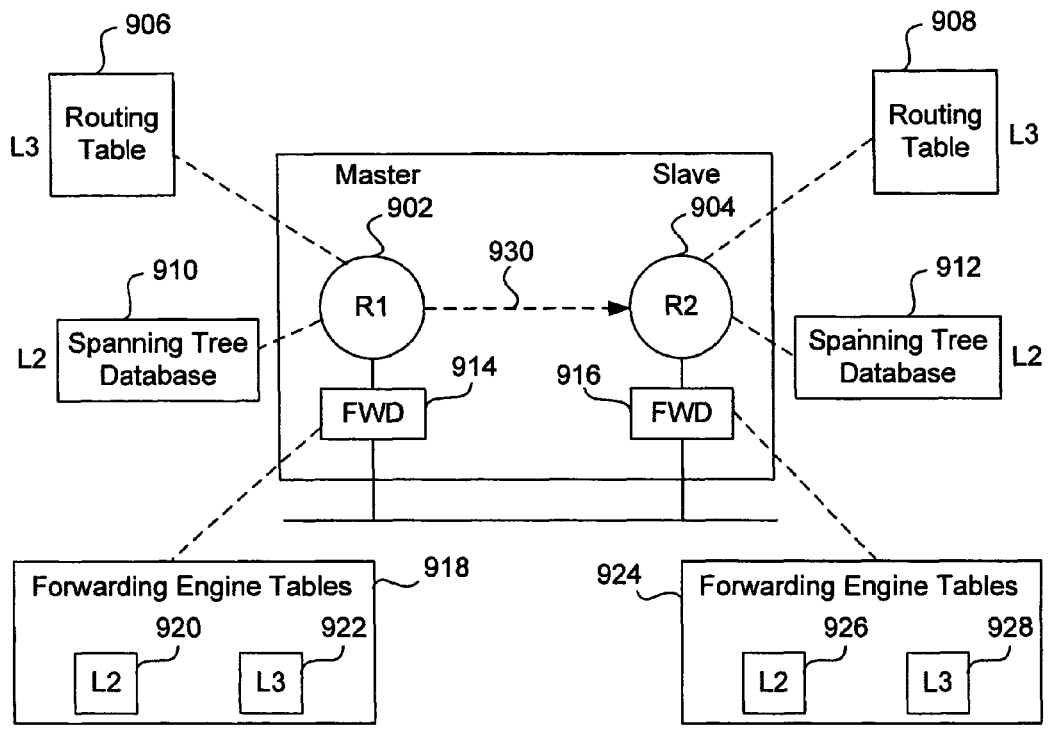
FIG. 9 is a block diagram illustrating a database configuration for the routing and switching system according to an embodiment of the invention.

Typically, in a routing and switching system, the hardware and software maintains layer 2 and layer 3 information in order to forward packets. According to one embodiment of the invention, each of the routers and forwarding engines maintains its own layer 2 and layer 3 data. As shown in FIG. 9, although the routers are provided in a single chassis, each of the routers 902 and 904 has its own layer 3 routing table 906 and 908 as well as its own layer 2 spanning tree database 910 and 912, respectively. In addition, associated forwarding engines 914 and 916 each maintain a set of forwarding engine tables. As shown, the first forwarding engine 914 has a set of forwarding engine tables 918 including a layer 2 table 920 and layer 3 shortcut table 922. In addition, the second forwarding engine 916 has a set of forwarding engine tables 924 including a layer 2 table 926 and layer 3 shortcut table 928. Where the first router 902 is the master and the second router 904 is the slave, the master sends information such as spanning tree updates to the slave, as shown at line 930. In addition, the slave and master routers 902 and 904 each maintains its own routing table 906 and 908, respectively, through routing updates received from other routers in the network. Similarly, each forwarding engine 914 and 916 updates its associated forwarding engine tables 918 and 924, respectively, through information obtained from packet headers of packets observed at the shared interfaces (not shown to simplify illustration).

Figure 10:
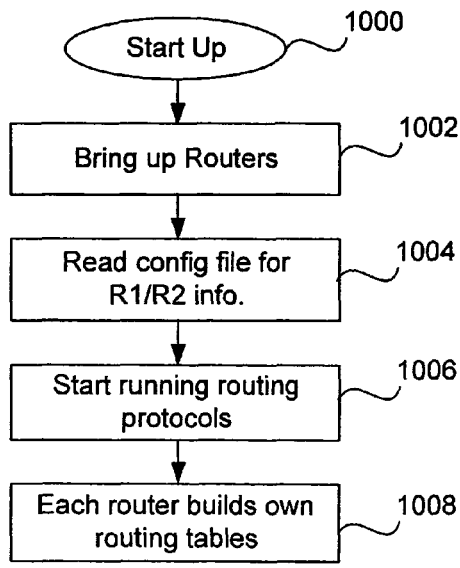
FIG. 10 is a process flow diagram illustrating one method of configuring the master and slave routers at start up.

In addition to determining which router is the master, both routers must be brought up such that they are fully functional. One method of configuring the master and slave routers at start up is presented in FIG. 10. As shown, the process at start up begins at block 1000 and the routers are brought up at block 1002. The configuration information is read from the configuration file for both routers at block 1004. As described earlier, the configuration information may fall in one of three categories. The routers start running the routing protocols at block 1006. The routing protocols of the two routers may be different, but are recommended to be the same. Each router then builds its own routing table as shown at block 1008. The routing tables are not synchronized. As known to those of ordinary skill in the art, the routers dynamically exchange routing updates. Each router then updates its own routing table based upon the information gathered in each of the routing updates.

Figure 11A:
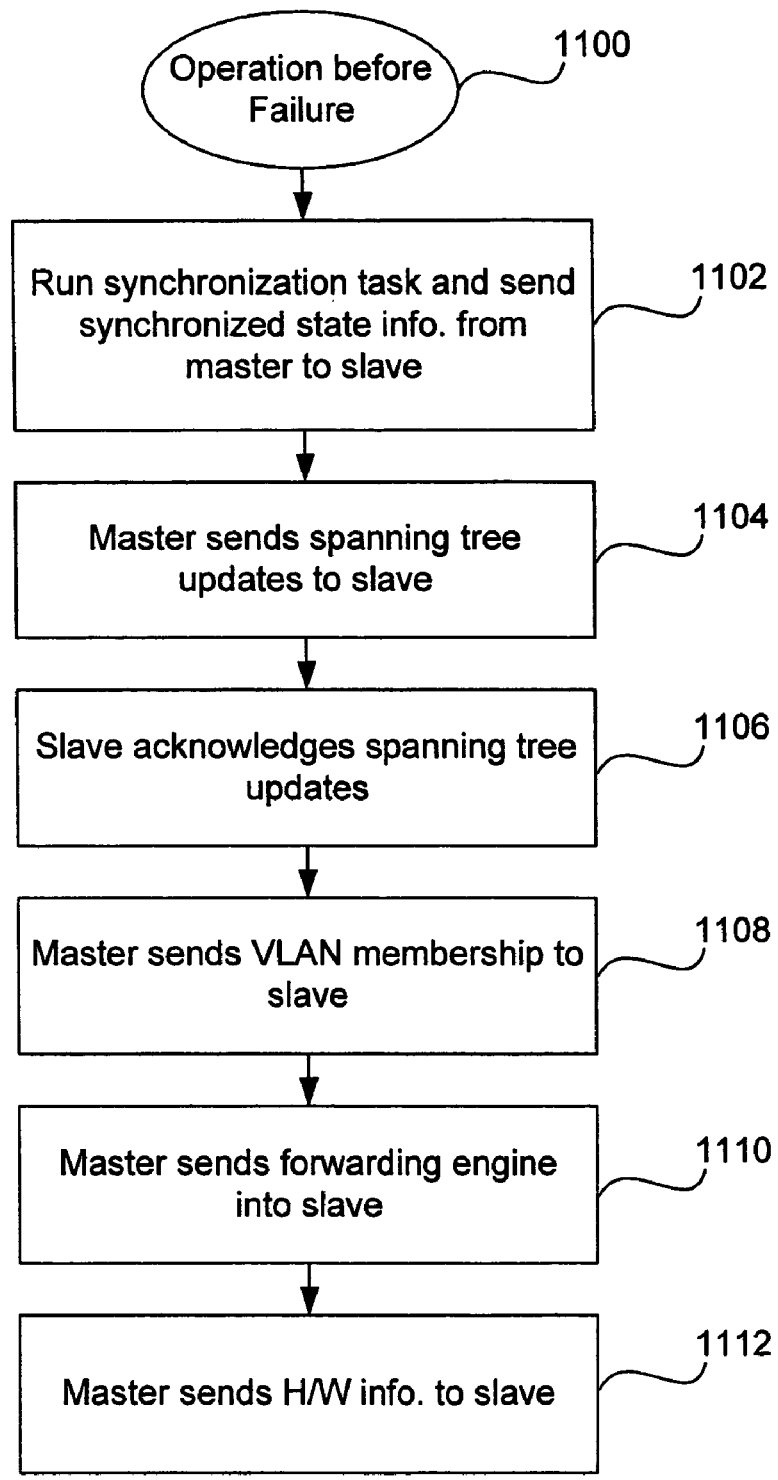
FIG. 11A is a process flow diagram illustrating one method of operating the master and slave prior to failure of one of the routers according to one embodiment of the invention.

Once both routers are fully functional, the master and slave continue to communicate information prior to failure of one of the routers. As shown in FIG. 11A, a method of operating the master and slave prior to failure of one of the routers according to one embodiment of the invention is presented. The process begins at block 1100 and at block 1102, a synchronization task runs in master/slave mode and the master sends to the slave synchronized state information to synchronize the port states and forward delay time. By way of example, the state of each port may indicate that the link is up or down, that the port is blocked, listening, or forwarding.

Both the master and the slave run layer 3 routing protocols and therefore each maintains its own routing table. However, only one of the routers runs the layer 2 spanning tree protocol at any given point in time. More particularly, prior to failure of the master router, the master runs the layer 2 spanning tree protocol. Only upon failover of the master router does the slave router run the layer 2 spanning tree protocol. Thus, at block 1104, the master sends a spanning tree update to the slave (e.g., specifying spanning tree states). For instance, the spanning tree update may indicate the states of the ports. Next, at block 1106, the slave acknowledges the spanning tree updates. The slave then updates its own spanning tree database such that the slave's spanning tree database is substantially identical to that maintained by the master. In addition, the VLAN membership of the master is sent to the slave at block 1108. In this manner, the slave may quickly determine which VLANs it will be supporting when the master fails. Forwarding engine information is then sent by the master to the slave to initialize the hardware of the slave at block 1110. Forwarding engine information may include, but is not limited to, port membership (i.e., association between ports and receivers), multicast group membership (e.g., which ports are members of which multicast groups). In addition, hardware information may be sent as necessary by the master to the slave at block 1112. Hardware information may include, but is not limited to, temperature and indication of power supply failure.

Figure 11B:
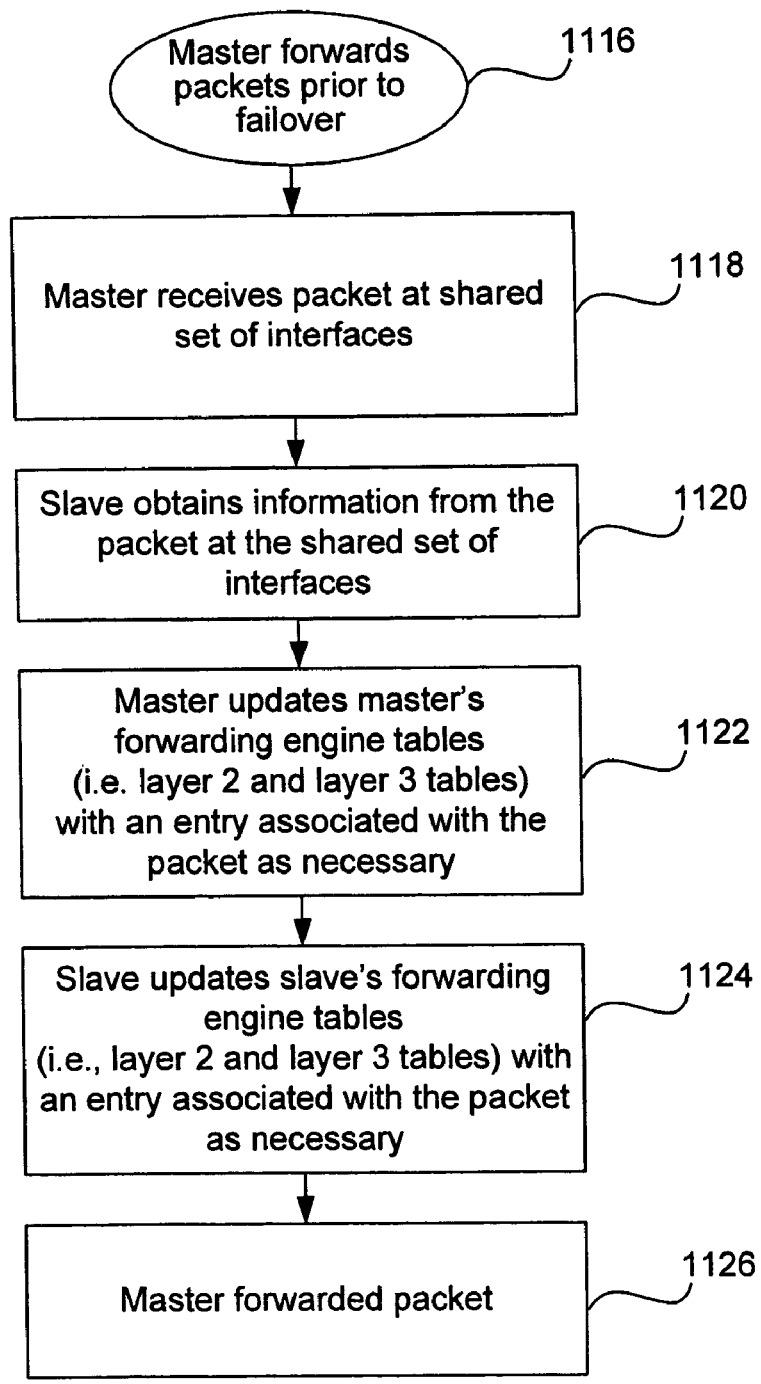
FIG. 11B is a process flow diagram illustrating one method of forwarding packets prior to failover.

FIG. 11A describes a method of operating the master router prior to failure of the master router. In addition, when a packet is received at the shared set of interfaces and forwarded by the master, the forwarding engine tables are updated by both the master and the slave. One method of forwarding packets prior to failover is presented in FIG. 11B. The process begins at block 1116 and at block 1118, the master receives a packet at the shared set of interfaces. Thus, the master obtains information from the packet header while actively forwarding the packet. Although the master may send this information to the slave via software, this is a time-consuming process. Since it is necessary for the slave to obtain the information required for its forwarding engine tables in a less time-consuming manner, the slave operates during "standby mode" to observe incoming and outgoing packets at the set of shared interfaces. Thus, the slave independently obtains information from the packet observed at the shared set of interfaces at block 1120. The master then updates the master's forwarding engine tables at block 1122, as necessary, with an entry associated with the packet. Exemplary forwarding engine tables will be shown and described with reference to FIGS. 13A and 13B. Similarly, at block 1124 the slave updates the slave's forwarding engine tables as necessary with an entry associated with the packet. The master then forwards the packet at block 1126. Therefore, at any given point in time, both the slave and the master will have essentially identical forwarding engine tables.

Figure 12A:
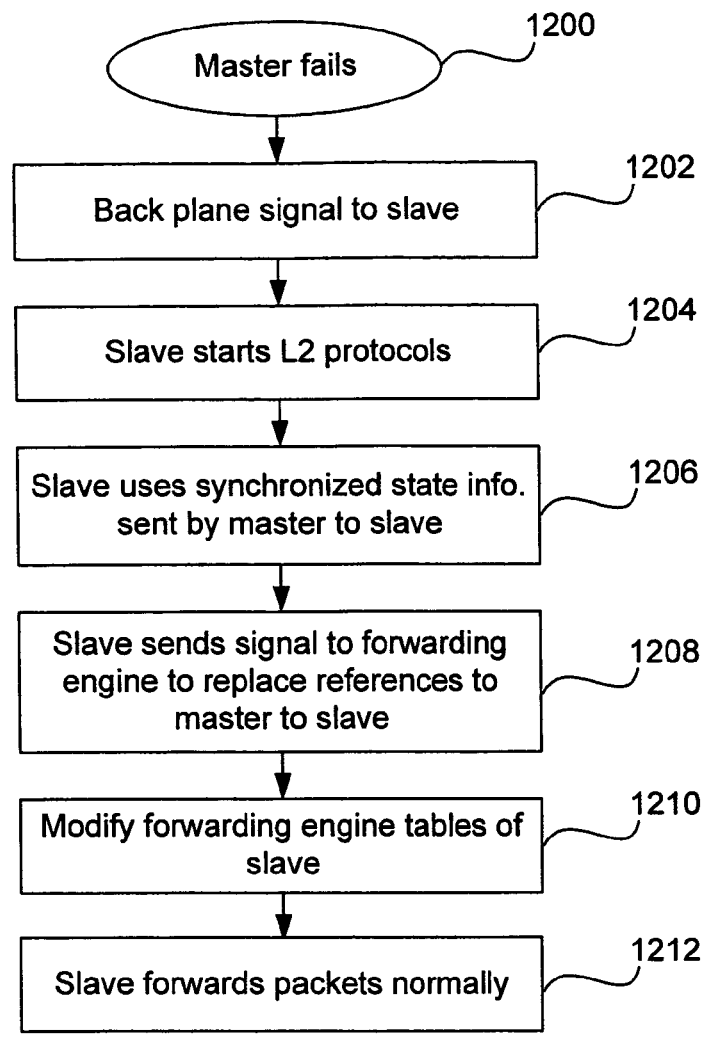
FIG. 12A is a process flow diagram illustrating one method of transitioning to the slave upon failure of the master according to an embodiment of the invention.

As described above, according to one embodiment, a failure of the hardware (i.e., switching engine) or software (i.e., routing processor or switch processor) in a router is treated as a failure of the entire router. FIG. 12A is a process flow diagram illustrating a method of transitioning to the slave upon failure of the master according to one embodiment of the invention. Upon failure of the master at 1200, a backplane signal is sent to the slave at block 1202. The slave then starts the layer 2 spanning tree protocols at block 1204. At block 1206, the slave then uses the synchronized state information previously sent by the master to the slave as shown at block 1102 of FIG. 11A. It is important to note that the slave typically starts at ground zero to obtain such synchronized state information. Since the slave need not start from ground zero, the failover time is substantially reduced.

As described above, in order to provide load sharing in the routing system, certain interfaces may have a specified default gateway (e.g., R1). Thus, when R1 fails, R2 must be specified as the new default gateway so that the forwarding engine tables may be modified accordingly. Exemplary forwarding engine tables and mechanisms for modifying these tables will be described in further detail below with reference to FIGS. 12C, 13A and 13B. Thus, at block 1208, the routing processor of the slave sends a signal to the forwarding engine to replace the references to the MAC address and IP address of the master with the MAC address and IP address of the slave, where appropriate. The forwarding engine tables of the slave are then modified at block 1210 so that packets may then be forwarded by the slave router at block 1212. An exemplary method of modifying the forwarding engine tables will be described with reference to FIG. 12C and exemplary forwarding engine tables will be described in further detail with reference to FIGS. 13A and 13B.

Figure 12B:
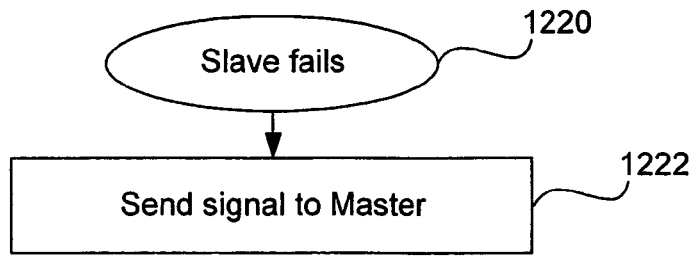
FIG. 12B is a process flow diagram illustrating one method of operating upon failure of the slave according to an embodiment of the invention.
Figure 12C:
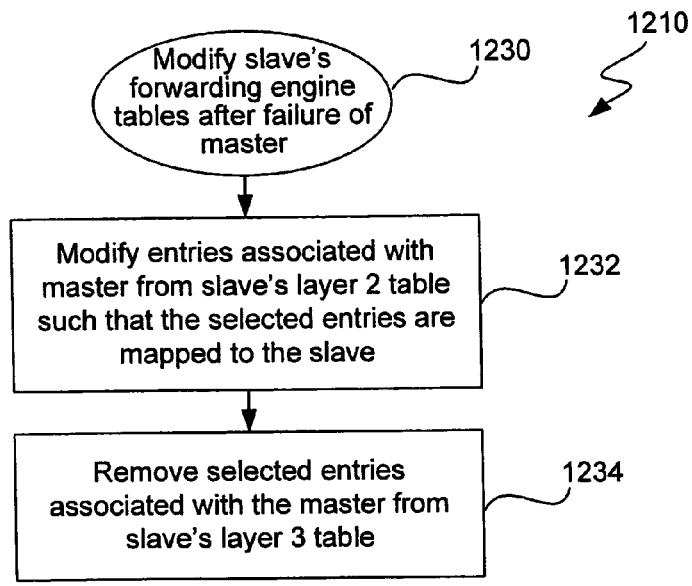
FIG. 12C is a process flow diagram illustrating one method of modifying the forwarding engine tables of the slave after failure of the master according to an embodiment of the invention.

When the slave fails, the slave merely notifies the master of its failure. As shown in FIG. 12B, when the slave fails 1220, a signal is sent to the master at block 1222.

Packets received at the shared interfaces may be forwarded in hardware via the forwarding engine or in software. However, packets must be encapsulated in the same manner regardless of whether the packets are forwarded in hardware or software. Thus, similarly to the information maintained by the routing processor and switching processor, the forwarding engines maintain layer 2 and layer 3 tables, as will be shown and described with reference to FIGS. 13A and 13B. As shown at block 1210 of FIG. 12A, the forwarding engine tables of the slave are modified after failure of the master to enable packets to be accurately forwarded by the slave. One method of modifying the forwarding engine tables of the slave after failure of the master is presented in FIG. 12C. The process begins at block 1230. In the absence of a layer 3 entry for a particular flow, a packet following this flow is sent via software. In order to determine the router used to send the packet, the layer 2 table is used to match the destination MAC address of the packet and therefore must contain updated information. Thus, at block 1232, entries in the slave's layer 2 table that are associated with the master are modified or replaced such that the resulting entries are mapped to the slave rather than the master. Once modified, the slave's layer 2 table may be used to determine the appropriate router to forward packets in the absence of an entry in the slave's layer 3 table. During forwarding of a packet, if there is no layer 3 entry, an entry in the layer 2 table associated with the destination MAC address of the packet is identified. The router identified in this layer 2 table entry is then used to forward the packet in software until a layer 3 entry for this flow is created.

In addition, the slave's layer 3 shortcut table is modified. Since the slave and the master share the same interfaces and are independently running routing protocols, they both should arrive at the same routing decision for a particular IP destination. However, there is no guarantee that all the routing updates will reach and get processed by both the slave and the master all the time. In theory, both the master and the slave will come to the same routing decisions. In addition, shortcuts in the router's layer 3 table are established upon forwarding of a packet by the router based upon information in its routing table. However, since the slave and the master operate independently, the shortcuts cannot be guaranteed to be identical for both the master and the slave. Moreover, these potentially invalid shortcuts take up space in a limited amount of space in the layer 3 table in hardware. Therefore, the shortcuts created by the master are invalidated on failover. As a result, at block 1234, selected entries associated with the master are removed from the slave's layer 3 table. Prior to removal of the entries from the slave's layer 3 table, packets may be routed via the slave's forwarding engine using the master's MAC address as the source MAC address. Once an entry for a particular flow is removed, packets may be forwarded in software until a new entry for the flow is created in the slave's layer 3 table. Later, when a packet belonging to the same flow (e.g., from the source IP address to the destination IP address) is routed by the slave, this removed entry is effectively "replaced" with an entry associated with the slave for this same "flow." Once the entry is replaced, packets may be routed via the slave's forwarding engine using the slave's MAC address as the source MAC address. In addition, on switchover, the floating default gateway IP address and the associated floating MAC address is now associated with the slave (e.g., with the MAC address of the slave). Accordingly, in order to enable forwarding by the slave's forwarding engine upon failure of the master without a period of delay, the shortcuts created by the master are used in the interim period after failure of the master and prior to updating the slave's layer 3 shortcuts.

Figure 12D:
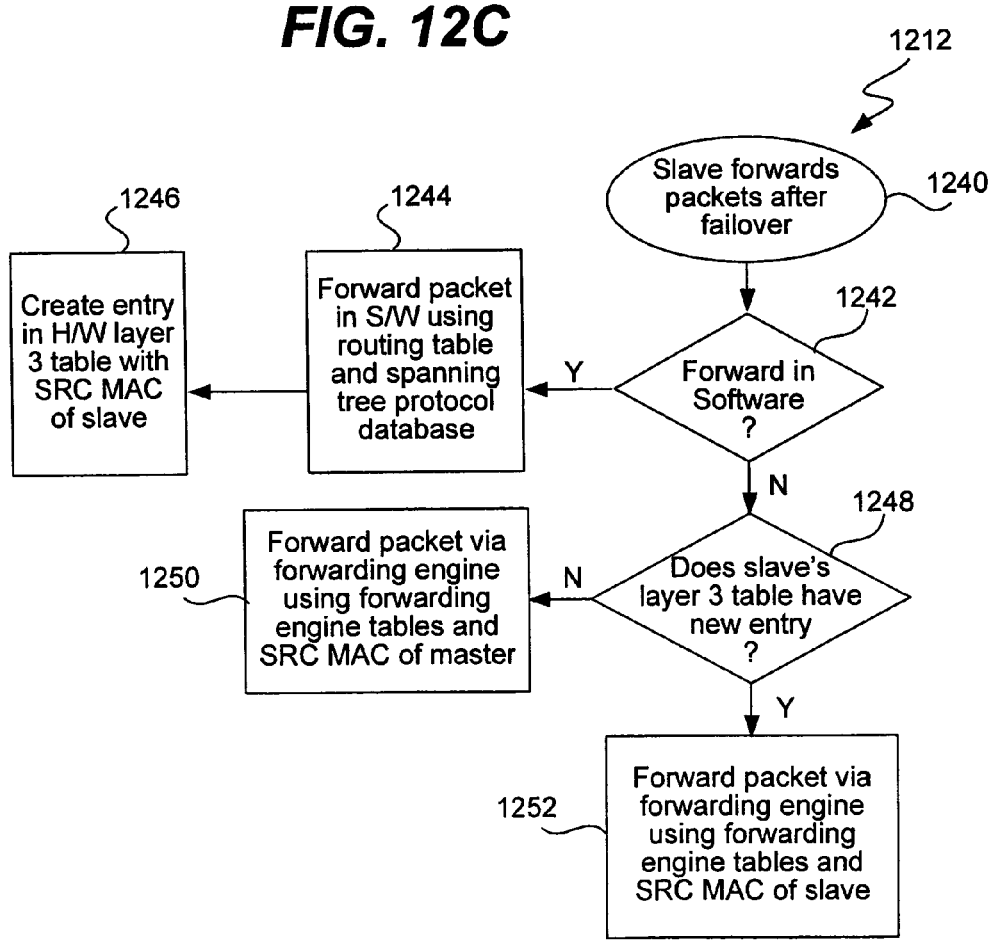
FIG. 12D is a process flow diagram illustrating one method of forwarding packets by the slave as shown at block 1212 of FIG. 12B after failure of the master according to an embodiment of the invention.

As described above with reference to FIG. 12C, packets may be forwarded by the slave router in hardware or software. Moreover, when the packet is forwarded in hardware (by the slave's forwarding engine) the source MAC address may be that of the master or the slave depending upon the status of the slave's forwarding engine tables. A flow diagram illustrating one method of forwarding packets by the slave as shown at block 1212 of FIG. 12B after failover of the master is presented in FIG. 12D. The process begins at block 1240 and at block 1242, the slave determines whether the packet is to be forwarded in software. For instance, even after the slave's layer 2 table has been modified, if there is no entry in the slave's layer 3 table for the path specified by the packet's header, the packet is forwarded in software. Thus, it is determined whether an entry associated with the packet is present in the layer 3 table. More particularly, using information in the packet header, it is determined whether the layer 3 table includes an entry associated with the source IP address and the destination IP address of the packet. If the layer 3 table does not include such an entry, the packet is routed in software until an entry has been created for the specified flow (i.e., path from source to destination). Moreover, if forwarding of the packet requires extra processing that cannot be performed or is difficult to perform in hardware, the packet is forwarded in software. The packet is then forwarded in software at block 1244 using the slave's routing tables and spanning tree protocol database. Once the packet is routed, an entry is created in the layer 3 table such that the source MAC address is that of the slave at block 1246.

As described above, if the slave's layer 3 table does not include an entry associated with the packet or it would otherwise be difficult or impossible to forward the packet in hardware, the packet is forwarded in software. Otherwise, the packet is routed via the forwarding engine and the process continues at block 1248 where it is determined whether the slave's layer 3 table includes a new or modified entry associated with the path of the packet to be forwarded. The packet is then forwarded with the appropriate source MAC address and destination MAC address as specified by the entry in the layer 3 table. More particularly, if the layer 3 table contains an entry that has not been removed or modified by the slave, the source MAC address identifies the master. However, if the layer 3 table includes an entry that has been created or modified by the slave, the source MAC address identifies the slave. Thus, if it is determined at block 1248 that the slave's layer 3 table does not include a new entry created by the slave, the packet is forwarded via the forwarding engine using the slave's forwarding engine tables and the source MAC address of the master at block 1250. If the slave's layer 3 table does include a new entry created by the slave, the packet is forwarded via the forwarding engine using the slave's forwarding engine tables and the source MAC address of the slave at block 1252.

Since both the slave and the master are independent operational routers, they may each come to different routing decisions. As a result, the slave and the master each maintains its own set of forwarding engine tables. Since the slave and the master share the same set of interfaces, the slave may observe incoming and outgoing packets and therefore obtains information to update its layer 2 and layer 3 tables. More particularly, prior to failure of the master, the master monitors all traffic entering the switch during active forwarding of packets while the slave monitors all traffic entering the switch while the slave is in standby mode. Thus, while the master's forwarding engine is actively forwarding packets, the slave is learning information from the bus (e.g., incoming packets). Once the master fails, the slave actively forwards packets and monitors all traffic coming into the switch, as the master did prior to its failure.

Figure 13A:
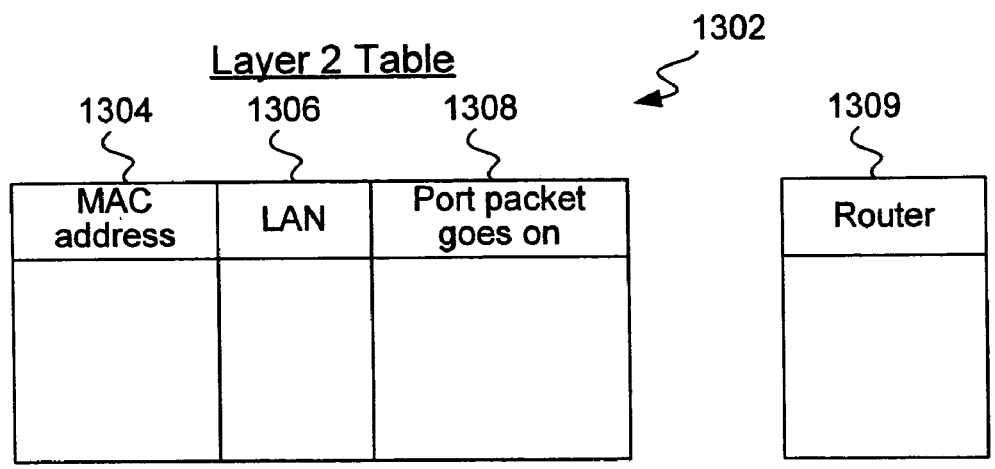
FIG. 13A is a diagram illustrating an exemplary layer 2 table that may be independently maintained by the master and the slave.
Figure 13B:
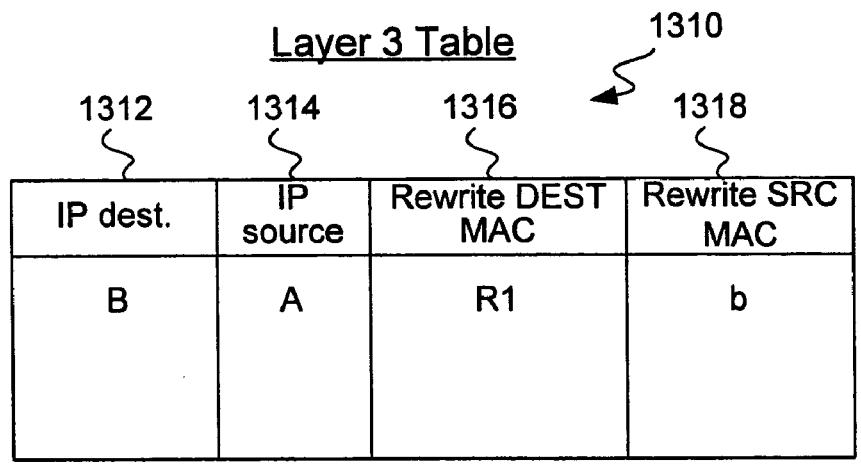
FIG. 13B is a diagram illustrating an exemplary layer 3 table that may be independently maintained by the master and the slave router.

Exemplary forwarding engine tables are described with reference to FIGS. 13A and 13B. More particularly, FIG. 13A is a diagram illustrating an exemplary layer 2 table that may be independently maintained by the master and the slave. The layer 2 table serves as a bridge forwarding database and therefore is used to determine the LAN and port used to send packets out. During normal operation, prior to failure of the master, both the slave and the master each monitor all traffic coming into the switch. Based upon the header of the incoming packet, an entry in the corresponding layer 2 table is created. As shown, the layer 2 table 1302 specifies a MAC address 1304 of a host as specified by the source MAC address of the incoming packet, an associated VLAN 1306 to which the host belongs, and a port 1308 that the packet has come in on. In addition, each entry is associated with a router 1309 (e.g., identified with the destination MAC address of the incoming packet), which may be accomplished in the layer 2 table or in a separate mapping table. For instance, the router 1309 may specify the slave or the master router. However, upon failure of the master, the slave modifies its layer 2 table entries to specify the slave as the router. When an entry for a particular flow is not in the layer 3 table, the packet is routed via a router associated with that flow. More particularly, an entry in the layer 2 table (or a separate mapping table) is matched with the destination MAC address as specified in the packet header. In this manner, the outgoing VLAN and outgoing port for a specified destination MAC address may be obtained from information learned from previously received incoming packets.

In addition, the master and the slave router each maintains its own layer 3 shortcut table. FIG. 13B is a diagram illustrating an exemplary layer 3 table 1310 that may be maintained by the master and the slave router. As shown, each entry in the L3 routing table specifies a destination IP address 1312, a source IP address 1314, a destination MAC address 1316, and a source MAC address 1318. As described above, since the slave and master share a single set of interfaces and therefore the same packet information, when a packet is forwarded by the master (e.g., by the routing processor), a shortcut is established and a corresponding entry is entered into the layer 3 table of the slave as well as that of the master. More particularly, the slave obtains the shortcut previously established by the master from the packet header. Prior to failure of the master, the slave's forwarding engine is in standby mode. During the standby mode, the slave's forwarding engine learns information from the bus (e.g., from the headers of the incoming packets) and updates its layer 3 shortcut table. As a result, the slave and the master have access to substantially identical layer 3 tables. In summary, during active forwarding of the master and during standby mode of the slave, layer 3 table entries are learned by the forwarding engine of both the master and the slave from the packet header via the shared interfaces between the two routers.

As described above with reference to block 1210 of FIG. 12A, when the master fails, the forwarding engine tables are modified. More particularly, as described above with reference to FIG. 13A, the layer 2 table of the slave is modified to replace references to the master with references to the slave such that each entry is mapped to the slave rather than the master. In addition, once the slave's layer 2 table has been modified, entries associated with the master may be identified and removed from the layer 3 table so that the source of the packet is correctly identified in the packet header. In other words, the layer 3 shortcuts established by the master are purged from the layer 3 table. However, as described above, where an entry does not exist in the slave's layer 3 table for a particular path, the packet is forwarded in software. Thus, if all entries in the slave's layer 3 table that have been established by the master are removed simultaneously, a substantial amount of traffic may be forwarded in software. However, the forwarding rate in hardware is much higher than that provided in software. It is therefore desirable to delete these entries in the slave's layer 3 table gradually to reduce the traffic forwarded in software. For instance, in order to stagger the traffic handled by the CPU of the slave, the entries in the slave's layer 3 table that have been created by the master may be modified one interface/port or VLAN at a time. Subsequently, when a packet is received by the slave, a shortcut is automatically established by the forwarding engine of the slave from information provided in the packet header. The slave's forwarding engine then enters this shortcut in the slave's layer 3 table. Thus, the new entry in the slave's layer 3 table correctly identifies the slave as the source of the packet. In this manner, the shortcuts established by the master are replaced with those established by the slave. The packet may then be switched via hardware. In this manner, the traffic handled by hardware is maximized.

When a first host wishes to communicate with a second host, it is often necessary to communicate via one or more routers. Where both hosts are directly connected to a single router, communication is accomplished through a single router or "hop." When packets must be sent via multiple routers, multiple "hops" are required. The present invention is designed to provide first hop as well as second hop routing redundancy for hosts. More particularly, when the master to slave switchover takes place, all packets from the host will be forwarded seamlessly to the destination. However, packets in the reverse direction must also be forwarded correctly even though the master has failed. This problem will be described with reference to the following figures.

Figure 14A:
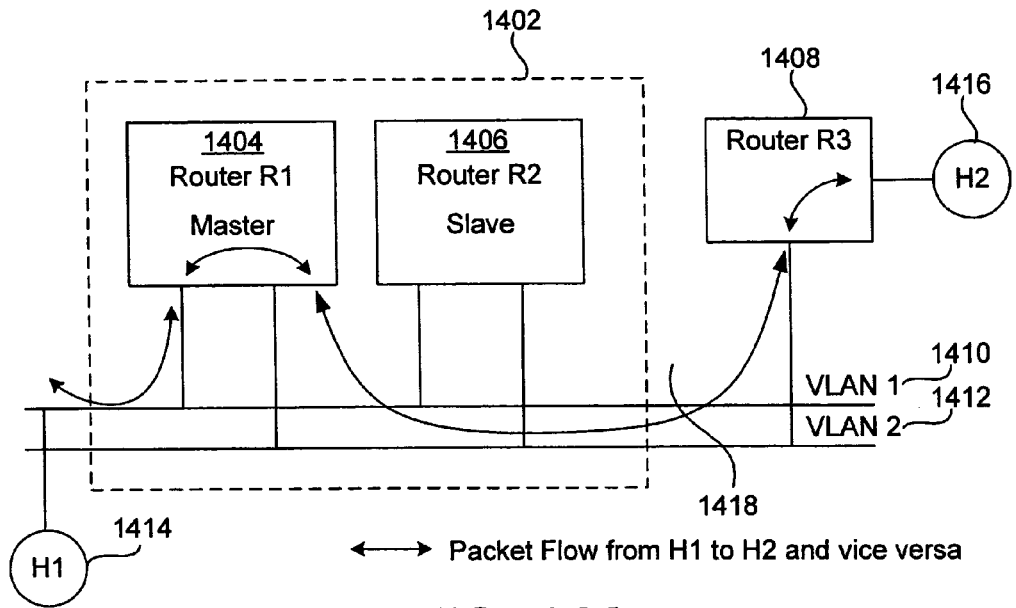
FIG. 14A is a diagram illustrating the need for second hop redundancy within a network.

As shown in FIG. 14A, a master-slave routing and switching system 1402 having a first router 1404 and a second router 1406 as described above is provided. In addition, a third router 1408 that is outside the routing and switching system 1402 is coupled to the routing and switching system 1402. As shown, the three routers 1404, 1406, and 1408 support a first VLAN 1410 and a second VLAN 1412. In the following example, a first host 1414 sends packets to a second host 1416 as well as receives packets from the second host 1416. For purposes of the following discussion, the first host 1414 has its default gateway configured with the IF address identifier and the default MAC address identifier of the default gateway. Through the default IP address identifier and the default MAC address identifier, the first router 1404 is then configured as the default gateway for the first VLAN 1410.

When the first host 1414 sends a packet to the first router 1404, the first router 1404 routes the packet to the third router 1408 to reach the final destination, the second host 1416, as shown at line 1418. Packets sent from the second host 1416 to the first host 1414 also follow the same path in the reverse direction.

Figure 14B:
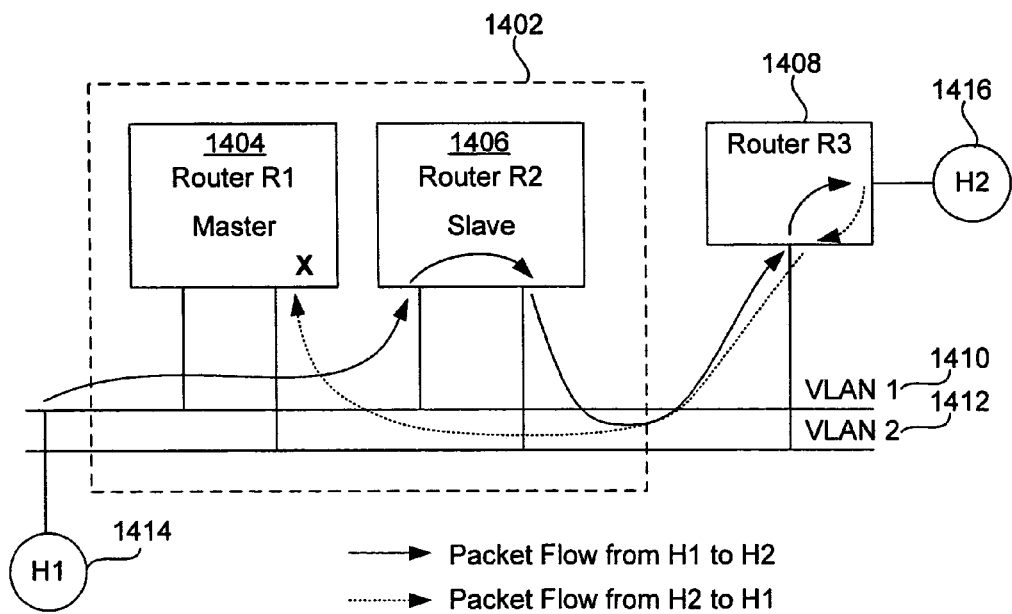
FIG. 14B is a diagram illustrating the problem created when second hop redundancy is not provided.

When the first router 1404 fails, the second router 1406 becomes the default gateway for the first VLAN 1410 and therefore packets sent by the first host 1414 are now redirected to the second router 1406, as shown in FIG. 14B by line 1420. The second router 1406 will then route the packets to the third router 1408 which will finally forward the packets to the destination, the second host 1416. However, the reverse traffic from the second host 1416 will get forwarded by the third router 1408 to the first router 1414 since the third router 1408 has not discovered that the first router 1404 has died. Depending on the routing protocols used, the time it takes for the third router 1408 to decide that the first router 1404 has failed and to recalculate its routes varies. Moreover, this time is much greater than the time it takes for the second router 1406 (i.e., slave) to realize that the first router 1404 (i.e., master) has died according to the present invention.

To avoid "blackholing" of this reverse traffic, the traffic destined for the actual MAC address of the first router 1404 will be diverted to the second router 1406. Moreover, the second router 1406 avoids forwarding traffic back to the first router 1404. In addition, control packets destined for the first router 1404 will not be processed by the second router 1406. In this manner, reverse traffic will be forwarded by the second router 1406 (i.e., slave) and second hop redundancy is implemented.

Generally, the load sharing and redundancy technique of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid load sharing and redundancy system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the load sharing and redundancy systems of this invention may be specially configured routers such as specially configured router models 1600, 2500, 2600, 3600, 4500, 4700, 7200, 7500, and 12000 and Catalyst switches such as models 5000 and 6000 available from Cisco Systems, Inc. of San Jose, Calif. A general architecture for some of these machines will appear from the description given below. In an alternative embodiment, the load sharing and redundancy system may be implemented on a general-purpose network host machine such as a personal computer or workstation. Further, the invention may be at least partially implemented on a card (e.g., an interface card) for a network device or a general-purpose computing device.

Figure 15:
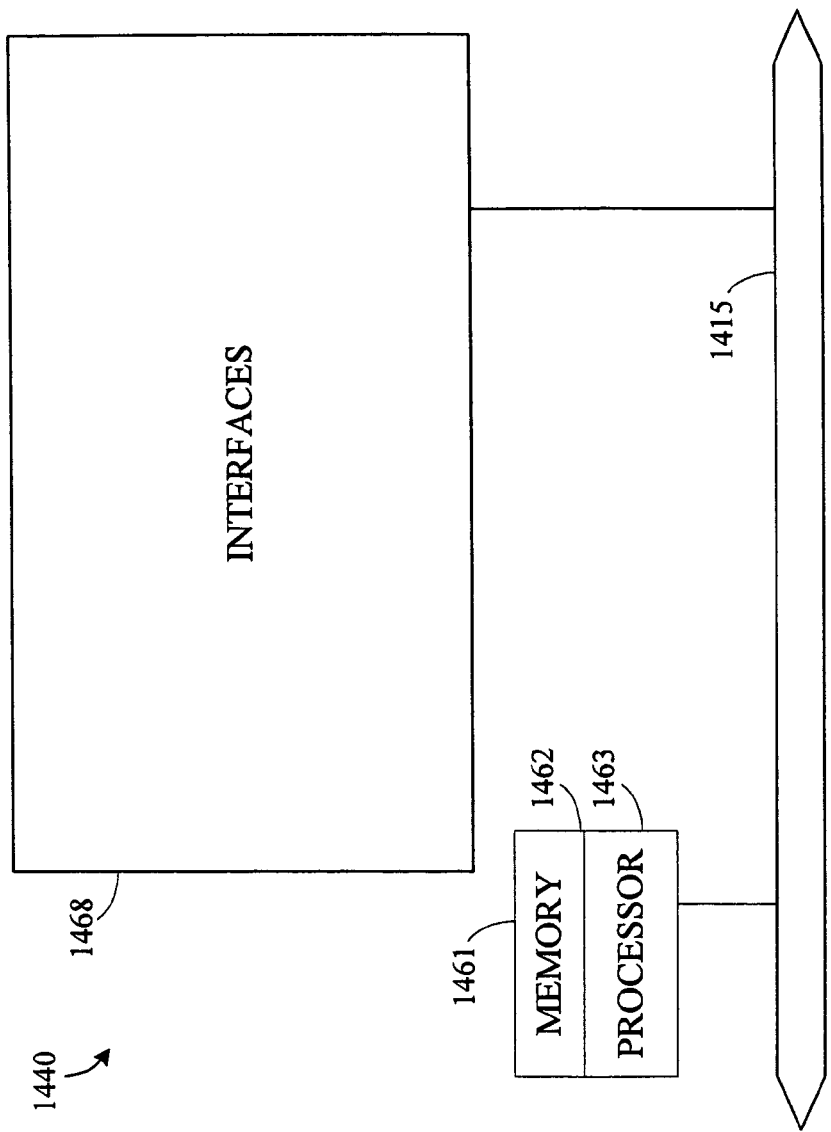
FIG. 15 is a block diagram of a network device that may be configured to implement aspects of the present invention.

Referring now to FIG. 15, a router 1440 suitable for implementing the present invention includes a master central processing unit (CPU) 1462, interfaces 1468, and a bus 1415 (e.g., a PCI bus). When acting under the control of appropriate software or firmware, the CPU 1462 is responsible for such router tasks as routing table computations and network management. It may also be responsible for functions previously described, such as maintaining layer 2 spanning tree protocol databases, modifying forwarding engine tables of the slave router, etc. It preferably accomplishes all these functions under the control of software including an operating system (e.g., the Internetwork Operating System (IOS®) of Cisco Systems, Inc.) and any appropriate applications software. CPU 1462 may include one or more processors 1463 such as a processor from the Motorola family of microprocessors or the MIPS family of microprocessors. In an alternative embodiment, processor 1463 is specially designed hardware for controlling the operations of router 1440. In a specific embodiment, a memory 1461 (such as non-volatile RAM and/or ROM) also forms part of CPU 1462. However, there are many different ways in which memory could be coupled to the system.

The interfaces 1468 are typically provided as interface cards (sometimes referred to as "line cards"). Generally, they control the sending and receiving of data packets over the network and sometimes support other peripherals used with the router 1440. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1462 to efficiently perform routing computations, network diagnostics, security functions, etc.

Although the system shown in FIG. 15 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (including memory 1461) configured to store program instructions for the general-purpose network operations and other load sharing and redundancy functions described herein. The program instructions may control the operation of an operating system and/or one or more applications, for example. The memory or memories may also be configured to store routing tables, layer 2 databases, forwarding engine tables, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For instance, although the specification has described routers, other entities used to tunnel packets to mobile nodes on remote network segments can be used as well. For example, bridges or other less intelligent packet switches may also employ the standby protocol of this invention. Accordingly, the present embodiments are to be considered as illustrative and not restrictive, and the invention is not to be limited to the details given herein, but may be modified within the scope and equivalents of the appended claims.

What is claimed is:

1. A system for forwarding packets received at a set of interfaces, the system comprising:

a first router having a first processor and a first memory associated therewith, wherein the first memory and the first processor are adapted to run a first layer 2 spanning tree protocol only when the first router is operating in active mode and a first layer 3 protocol, the first memory storing a first database; and a second router having a second processor and a second memory associated therewith, wherein the second memory and the second processor are adapted to run a second layer 2 spanning tree protocol only when the second router is operating in the active mode and a second layer 3 protocol, the second memory storing a second database, wherein the second database is updated with updates received from the first router when the first router is operating in the active mode and the second router is operating in standby mode, wherein the updates include spanning tree updates;

a first forwarding engine coupled to the first router, the first forwarding engine being associated with a first forwarding information for facilitating forwarding of packets in hardware; and a second forwarding engine coupled to the second router, the second forwarding engine being associated with a second forwarding information for facilitating forwarding of packets in hardware;

wherein the first forwarding engine and the second forwarding engine obtain information from packets at the set of interfaces in order to update the first and second forwarding information;

wherein the first forwarding information and second forwarding information are not transmitted between the first router and the second router;

wherein the first forwarding information includes a first layer 2 table and the second forwarding information includes a second layer 2 table, wherein the first and second layer 2 tables associate one or more MAC addresses with the first router or the second router;

wherein the first forwarding information further includes a first layer 3 table and the second forwarding information further includes a second layer 3 table, wherein the first and second layer 3 tables specify one or more shortcuts specifying layer 3 forwarding information, each one of the one or more shortcuts being associated with a flow associated with a source IP address and destination IP address, each of the first and second layer 2 tables enabling packets to be forwarded by a specified router when an entry specifying a particular flow is not stored in the corresponding one of the first and second layer 3 tables;

wherein when the second router is operating in active mode, the first router is operating in standby mode;

wherein when the first router is operating in active mode, the second router is operating in standby mode;

wherein the first router and the second router share the set of interfaces.

2. The system as recited in claim 1, wherein the updates received from the first router when the first router is operating in the active mode do not include layer 3 protocol updates.

3. The method as recited in claim 1, wherein the first layer 3 protocol is different from the second layer 3 protocol.

4. A method of enabling a slave router to forward packets received at a set of interfaces, comprising:

maintaining a routing table;

receiving updates from a master router running a protocol, the updates including at least one of synchronized state information indicating states of ports associated with the set of interfaces or VLAN membership of the master router; and updating a database with the updates received from the master router, thereby enabling the slave router to forward packets received at the set of interfaces upon failure of the master router.

5. The method as recited in claim 4, further comprising:

obtaining information from a packet at the shared set of interfaces by the slave router; and updating a set of forwarding data maintained by the slave router with the obtained information, the set of forwarding data for facilitating forwarding of packets.

6. The method as recited in claim 5, wherein the information obtained from the packet at the shared set of interfaces by the slave router includes a shortcut created by the master router, the shortcut specifying layer 3 forwarding information.

7. The method as recited in claim 5, further comprising:

modifying the set of forwarding data maintained by the slave router in response to a failure of the master router.

8. The method as recited in claim 7, further comprising:

forwarding a packet by the slave router;

wherein forwarding the packet by the slave router is performed using a source MAC address of the master router.

9. The method as recited in claim 8, wherein forwarding the packet by the slave router is performed using a source MAC address of the master router when a shortcut associated with the packet and established by the master router has not been invalidated by the slave router, the shortcut specifying layer 3 forwarding information.

10. The method as recited in claim 7, wherein the set of forwarding data includes shortcuts established by the master router and modifying includes invalidating selected shortcuts established by the master router, wherein each of the shortcuts specifies layer 3 forwarding information.

11. The method as recited in claim 10, further comprising:

forwarding a packet by the slave router;

creating a shortcut associated with the slave router, the shortcut specifying layer 3 forwarding information; and entering the shortcut in the set of forwarding data.

12. The method as recited in claim 11, wherein forwarding the packet by the slave router is performed using a source MAC address of the slave router.

13. The method as recited in claim 12, wherein forwarding the packet by the slave is performed using a source MAC address of the slave router when a shortcut associated with the packet and established by the master router has been invalidated by the slave router, the shortcut specifying layer 3 forwarding information.

14. The method as recited in claim 5, wherein only the master router runs a layer 2 spanning tree protocol, wherein the master router sends spanning tree updates to the slave router.

15. The method as recited in claim 4, further comprising:

configuring a number of ports in a first router and a second router, wherein the number of ports in the first router and the second router is identical;

configuring a type of the ports associated with the first router and the second router, wherein the type of ports associated with the first router is identical to the type of ports of the second router; and configuring a set of security information associated with both the first router and the second router.

16. The method as recited in claim 5, wherein the packet is not transmitted between the master router and the slave router.

17. A non-transitory computer-readable medium storing thereon computer-readable instructions for enabling a slave router to forward packets received at a set of interfaces, comprising:

instructions for maintaining a routing table;

instructions for receiving updates from a master router running a protocol, the updates including at least one of synchronized state information indicating states of ports associated with the set of interfaces or VLAN membership of the master router; and instructions for updating a database with the updates received from the master router, thereby enabling the slave router to forward packets received at the set of interfaces upon failure of the master router.

18. An apparatus for enabling a slave router to forward packets received at a set of interfaces, comprising:

a processor; and a memory, at least one of the processor or the memory being configured for:

maintaining a routing table;

receiving updates from a master router running a protocol, the updates including at least one of synchronized state information indicating states of ports associated with the set of interfaces or VLAN membership of the master router; and updating a database with the updates received from the master router, thereby enabling the slave router to forward packets received at the set of interfaces upon failure of the master router.

19. The apparatus as recited in claim 18, further comprising:

at least one of the processor or the memory being further configured for:

obtaining information from a packet at the set of interfaces by the slave router; and updating a set of forwarding data maintained by the slave router with the obtained information, the set of forwarding data for facilitating forwarding of packets.

20. The apparatus as recited in claim 19, wherein the information obtained from the packet at the set of interfaces by the slave router includes a shortcut created by the master router, the shortcut specifying layer 3 forwarding information.

21. The apparatus as recited in claim 19, further comprising:

at least one of the processor or the memory being further configured for:

modifying the set of forwarding data maintained by the slave router in response to a failure of the master router.

22. The apparatus as recited in claim 21, further comprising:
at least one of the processor or the memory being further configured for:
forwarding a packet by the slave router;
wherein forwarding the packet by the slave router is performed using a source MAC address of the master router.

23. The apparatus as recited in claim 22, wherein forwarding the packet by the slave router is performed using a source MAC address of the master router when a shortcut associated with the packet and established by the master router has not been invalidated by the slave router, the shortcut specifying layer 3 forwarding information.

24. The apparatus as recited in claim 21, wherein the set of forwarding data includes shortcuts established by the master router and modifying includes invalidating selected shortcuts established by the master router, wherein each of the shortcuts specifies layer 3 forwarding information.

25. The apparatus as recited in claim 24, further comprising:
at least one of the processor or the memory being further configured for:
forwarding a packet by the slave router;
creating a shortcut associated with the slave router, the shortcut specifying layer 3 forwarding information; and
entering the shortcut in the set of forwarding data.

26. The apparatus as recited in claim 25, wherein forwarding the packet by the slave router is performed using a source MAC address of the slave router.

27. The apparatus as recited in claim 26, wherein forwarding the packet by the slave is performed using a source MAC address of the slave router when a shortcut associated with the packet and established by the master router has been invalidated by the slave router, the shortcut specifying layer 3 forwarding information.

* * * * *